United States Patent
Gatlin et al.

(10) Patent No.: US 8,563,481 B2
(45) Date of Patent: Oct. 22, 2013

(54) CORROSION INHIBITOR SYSTEMS FOR LOW, MODERATE AND HIGH TEMPERATURE FLUIDS AND METHODS FOR MAKING AND USING SAME

(75) Inventors: Larry W. Gatlin, San Antonio, TX (US); Khalid Ali Shah, Calgary (CA)

(73) Assignee: Clearwater International LLC, Houston, TX (US)

( * ) Notice: Subject to any disclaimer, the term of this patent is extended or adjusted under 35 U.S.C. 154(b) by 933 days.

(21) Appl. No.: 11/066,600

(22) Filed: Feb. 25, 2005

(65) Prior Publication Data

US 2006/0194700 A1    Aug. 31, 2006

(51) Int. Cl.
*C09K 8/05* (2006.01)
*C09K 8/08* (2006.01)

(52) U.S. Cl.
USPC ........... 507/128; 507/110; 507/120; 507/130; 507/131; 507/137; 507/138; 507/140

(58) Field of Classification Search
None
See application file for complete search history.

(56) References Cited

U.S. PATENT DOCUMENTS

| | | | | | |
|---|---|---|---|---|---|
| 2,080,553 | A | * | 5/1937 | Wilson et al. | 510/262 |
| 2,814,593 | A | * | 11/1957 | Beiswanger et al. | 507/240 |
| 3,017,257 | A | * | 1/1962 | Counts et al. | 44/372 |
| 3,024,259 | A | * | 3/1962 | Counts et al. | 554/47 |
| 3,414,521 | A | * | 12/1968 | Teumac | 134/41 |
| 3,668,137 | A | * | 6/1972 | Gardner | 507/242 |
| 3,779,935 | A | | 12/1973 | McDougall | |
| 4,151,099 | A | * | 4/1979 | Nassry et al. | 508/250 |
| 4,339,349 | A | * | 7/1982 | Martin et al. | 507/238 |
| 4,341,657 | A | | 7/1982 | Quinlan | |
| 4,350,600 | A | * | 9/1982 | Sharp et al. | 507/251 |
| 4,450,102 | A | * | 5/1984 | Lindstrom et al. | 510/254 |
| 4,938,925 | A | * | 7/1990 | Petersen et al. | 422/12 |
| 5,027,901 | A | * | 7/1991 | French et al. | 166/310 |
| 5,158,693 | A | | 10/1992 | Ramanarayanan | |
| 5,603,818 | A | * | 2/1997 | Brent et al. | 204/488 |
| 5,611,992 | A | * | 3/1997 | Naraghi et al. | 422/15 |
| 5,753,596 | A | * | 5/1998 | Martin et al. | 507/237 |
| 6,036,888 | A | * | 3/2000 | Minevski | 252/395 |
| 6,063,334 | A | * | 5/2000 | Naraghi | 422/7 |
| 6,521,028 | B1 | * | 2/2003 | Frenier | 106/14.42 |
| 7,135,440 | B2 | * | 11/2006 | Campbell | 507/269 |
| 7,219,735 | B2 | * | 5/2007 | Smith et al. | 166/305.1 |
| 8,071,523 | B2 | | 12/2011 | Kany et al. | |
| 2004/0110645 | A1 | * | 6/2004 | Campbell | 507/200 |
| 2005/0130847 | A1 | | 6/2005 | Gatlin et al. | E21B 43/00 |
| 2005/0137114 | A1 | | 6/2005 | Gatlin et al. | C11D 17/00 |
| 2005/0153846 | A1 | | 7/2005 | Gatlin | C10G 29/20 |
| 2005/0187113 | A1 | * | 8/2005 | Hayes | 507/119 |
| 2005/0250666 | A1 | | 11/2005 | Gatlin et al. | C11D 17/00 |
| 2006/0116296 | A1 | | 6/2006 | Gatlin et al. | |

OTHER PUBLICATIONS

U.S. Appl. No. 11/328,432, filed Jan. 9, 2006, Wilson.

(Continued)

*Primary Examiner* — John J Figueroa
(74) *Attorney, Agent, or Firm* — Robert W Strozier

(57) ABSTRACT

A corrosion control system is disclosed including an anionic oxygen inhibitor, a cationic acid inhibitor or dispersant, and a noxious species inhibitor or scavenger for use in a fluid in contact with a metallic surface at low temperature, moderate temperature and especially at high temperature. A drilling fluid, a completion fluid, a production fluid and a geothermal fluid including an effective amount of the corrosion control system is also disclosed as well as methods for making and using same.

22 Claims, 13 Drawing Sheets

(56) References Cited

OTHER PUBLICATIONS

U.S. Appl. No. 11/293,859, filed Dec. 2, 2005, Kippie et al.
U.S. Appl. No. 11/298,547, filed Dec. 9, 2005, Gatlin et al.
U.S. Appl. No. 11/298,556, filed Dec. 9, 2005, Gatlin et al.
U.S. Appl. No. 11/339,303, filed Jan. 25, 2006, Lukos et al.
U.S. Appl. No. 11/545,387, filed Oct. 10, 2006, Gatlin et al.
U.S. Appl. No. 11/554,834, filed Oct. 31, 2006, Venditto et al.

* cited by examiner

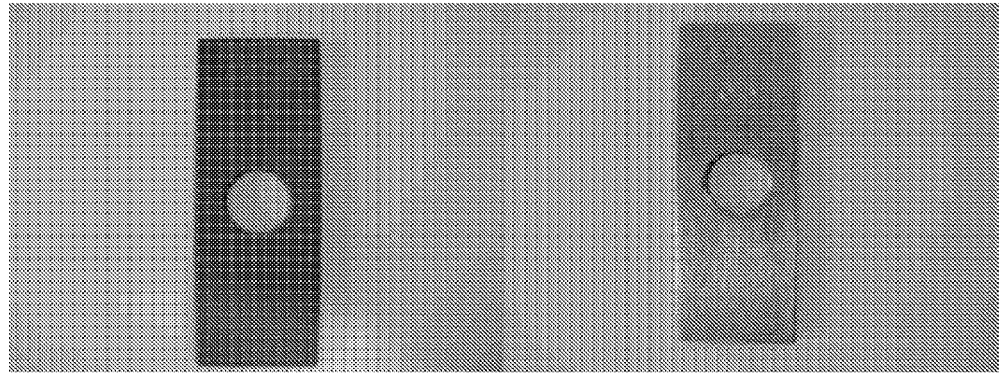
FIG. 2A  FIG. 2B
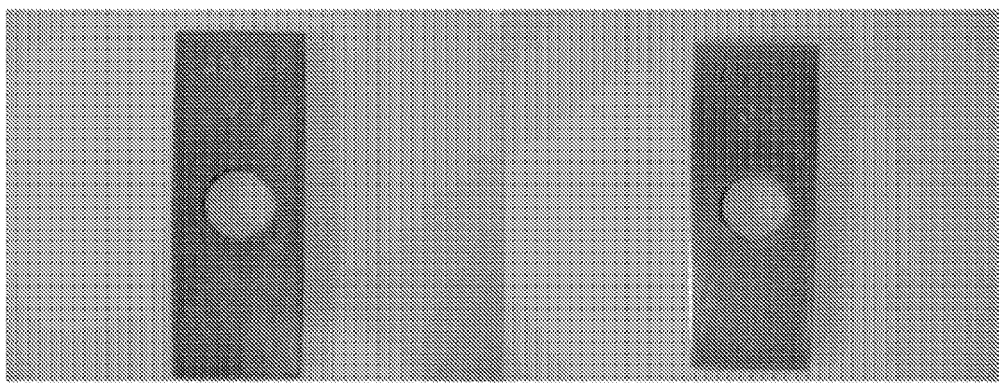
FIG. 2C  FIG. 2D
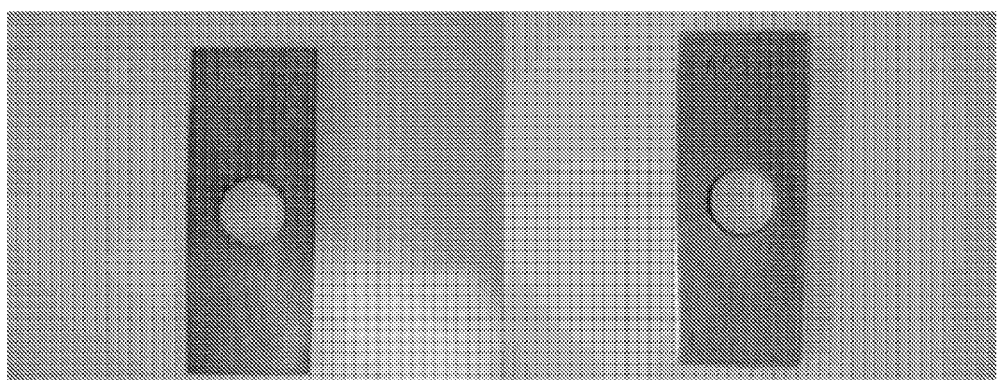
FIG. 2E  FIG. 2F

Group 7 after being removed from the autoclave

Group 7 after being removed from the bottles

Group 7 after being wiped with a cloth

Group 7 after being cleaned with inhibited acid

CORROSION INHIBITOR SYSTEMS FOR LOW, MODERATE AND HIGH TEMPERATURE FLUIDS AND METHODS FOR MAKING AND USING SAME

BACKGROUND OF THE INVENTION

1. Field of the Invention

The present invention relates to a corrosion inhibitor system for low, moderate and/or high temperature applications such as geothermal applications, oil field applications, power plant applications or other low, moderate and high temperature applications where scale and corrosion are problems and to methods for making and using same.

More particularly, the present invention relates to a scale and corrosion inhibitor system for low, moderate, and high temperature applications such as geothermal applications, oil field applications, power plant applications or other low, moderate and/or high temperature applications where scale and corrosion are problems and to methods for making and using same, where the system includes a scale inhibitor, a noxious species inhibitor or scavenger and an acid inhibitor or scavenger.

2. Description of the Related Art

Scale and corrosion are longstanding problems encountered in many industries. Scale and corrosion are significant problems in many high temperature applications such as geothermal fluid production, power plant circulating fluids, oil fluid circulation and production or other application where temperatures are involved and scale and corrosion are limit the life time of equipment.

Although many corrosion and scale inhibitors are known and used in high temperature application, many of these systems have limitations and do not provide the type of protection to allow significant extend equipment life time. Thus, there is a need in the art for corrosion and scale inhibition system that is effective a low, moderate and high temperatures and can significantly extend the service life of equipment exposed to corrosive low, moderate or temperature environments.

DEFINITIONS USED IN THE INVENTION

An over-balanced pressure drilling fluid means a drilling fluid having a hydrostatic density (pressure) higher than a formation density (pressure). For example, if a known formation at 10,000 ft (True Vertical Depth—TVD) has a hydrostatic pressure of 5,000 psi or 9.6 lbm/gal, an over-balanced drilling fluid would have a hydrostatic pressure greater than 9.6 lbm/gal.

An under-balanced and/or managed pressure drilling fluid means a drilling fluid having a hydrostatic density (pressure) lower or equal to a formation density (pressure). For example, if a known formation at 10,000 ft (True Vertical Depth—TVD) has a hydrostatic pressure of 5,000 psi or 9.6 lbm/gal, an under-balanced drilling fluid would have a hydrostatic pressure less than or equal to 9.6 lbm/gal. Most under-balanced and/or managed pressure drilling fluids include at least a density reduction additive. Other additive many include a corrosion inhibitor, a pH modifier and a shale inhibitor.

The following definitions are provided in order to aid those skilled in the art in understanding the detailed description of the present invention.

The term "amphoteric" refers to surfactants that have both positive and negative charges. The net charge of the surfactant can be positive, negative, or neutral, depending on the pH of the solution.

The term "anionic" refers to those viscoelastic surfactants that possess a net negative charge.

The abbreviation "RPM" refers to relative permeability modifiers.

The term "surfactant" refers to a soluble, or partially soluble compound that reduces the surface tension of liquids, or reduces inter-facial tension between two liquids, or a liquid and a solid by congregating and orienting itself at these interfaces.

The term "viscoelastic" refers to those viscous fluids having elastic properties, i.e., the liquid at least partially returns to its original form when an applied stress is released.

The phrase "viscoelastic surfactants" or "VES" refers to that class of compounds which can form micelles (spherulitic, anisometric, lamellar, or liquid crystal) in the presence of counter ions in aqueous solutions, thereby imparting viscosity to the fluid. Anisometric micelles in particular are preferred, as their behavior in solution most closely resembles that of a polymer.

The abbreviation "VAS" refers to a Viscoelastic Anionic Surfactant, useful for fracturing operations and frac packing. As discussed herein, they have an anionic nature with preferred counterions of potassium, ammonium, sodium, calcium or magnesium.

A sulfur scavenger is a compounds that converts noxious sulfur-containing compounds such as hydrogen sulfide into less noxious sulfur-containing compounds or into benign sulfur-containing compounds.

A triazine is a six membered ring including nitrogen atom at adjacent positions of the six membered ring.

The term low temperature means a temperature between about 100° F. and about 250° F.

The term moderate temperature means a temperature between about 250° F. and about 450° F.

The term high temperature means a temperature between about 450° F. and about 600° F.

SUMMARY OF THE INVENTION

Corrosion Control Systems

The present invention provides a corrosion control system including an anionic oxygen inhibitor, a cationic acid inhibitor or dispersant, and a noxious species inhibitor or scavenger.

The present invention provides a corrosion control system including an anionic phosphate ester oxygen inhibitor, a cationic acid inhibitor or dispersant, and a noxious species inhibitor or scavenger.

The present invention also provides a corrosion control system including a phosphate ester, a cationic dispersant, a sulfur scavenger and embrittlement inhibitor.

The present invention provides a corrosion control system including a salt of a glycol phosphate ester, a quinoline quat surfactant type acid inhibitor, and a formaldehyde-amine type sulfur scavenger and embrittlement inhibitor.

The present invention also provides a corrosion control system including a salt of a glycol phosphate ester, a quinoline quat surfactant type acid inhibitor, and a formaldehyde monoalkylanol amine type sulfur scavenger and embrittlement inhibitor.

The present invention provides a corrosion control system including a salt of a glycol phosphate ester, quinoline quat surfactant type acid inhibitor, a triazine type sulfur scavenger and embrittlement inhibitor.

The present invention also provides a corrosion control system including a salt of a glycol phosphate ester, quinoline quat surfactant type acid inhibitor, a formaldehyde sterically hindered amine type sulfur scavenger and embrittlement inhibitor.

Methods of Using the Corrosion Control Systems

The present invention provides a method including the step of adding on a continuous, semi-continuous, periodic, intermittent or discrete basis to a fluid a corrosion control system of this invention at a concentration sufficient to reduce corrosion of metal in contact with the fluid.

The present invention also provides a method including the step of adding on a continuous, semi-continuous, periodic, intermittent or discrete basis to a high temperature fluid a corrosion control system of this invention at a concentration sufficient to reduce corrosion in contact with the high temperature fluid.

The present invention provides a method including the step of adding on a continuous, semi-continuous, periodic, intermittent or discrete basis to a high temperature geothermal fluid a corrosion control system of this invention at a concentration sufficient to reduce corrosion in contact with the high temperature geothermal fluid.

The present invention also provides a method including the step of adding on a continuous, semi-continuous, periodic, intermittent or discrete basis to a drilling fluid a corrosion control system of this invention at a concentration sufficient to reduce corrosion in contact with the drilling fluid.

The present invention also provides a method including the step of adding on a continuous, semi-continuous, periodic, intermittent or discrete basis to a high temperature drilling fluid a corrosion control system of this invention at a concentration sufficient to reduce corrosion in contact with the high temperature drilling fluid.

The present invention also provides a method including the step of adding on a continuous, semi-continuous, periodic, intermittent or discrete basis to a fracturing fluid a corrosion control system of this invention at a concentration sufficient to reduce corrosion in contact with the drilling fluid.

The present invention also provides a method including the step of adding on a continuous, semi-continuous, periodic, intermittent or discrete basis to a high temperature fracturing fluid a corrosion control system of this invention at a concentration sufficient to reduce corrosion in contact with the high temperature drilling fluid.

BRIEF DESCRIPTION OF THE DRAWINGS

The invention can be better understood with reference to the following detailed description together with the appended illustrative drawings in which like elements are numbered the same:

FIGS. 2A-F depict coupons from Tests 3-5 are shown both pre-acid wash, FIGS. 2A, C and E, and post acid wash, FIGS. 2B, D and F;

FIG. 5O depicts the Test 23 solutions of Example 17 are shown after 24 hours in the autoclave;

DETAILED DESCRIPTION OF THE INVENTION

Figure 1A:
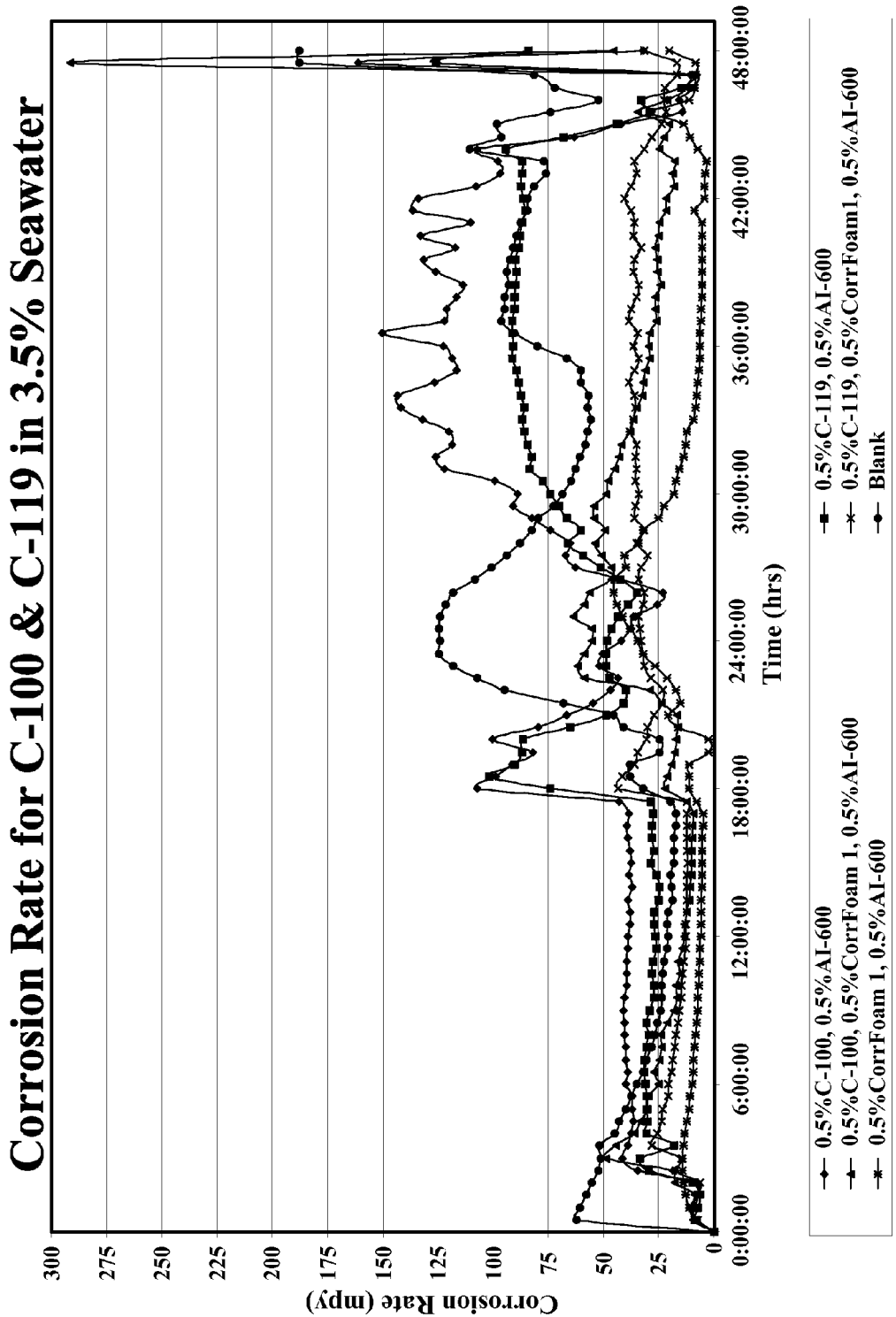
FIGS. 1A&B depict plots of corrosion rate and imbalance for several C-100 and C-119 compositions in 3.5% Seawater, respectively.
Figure 1B:
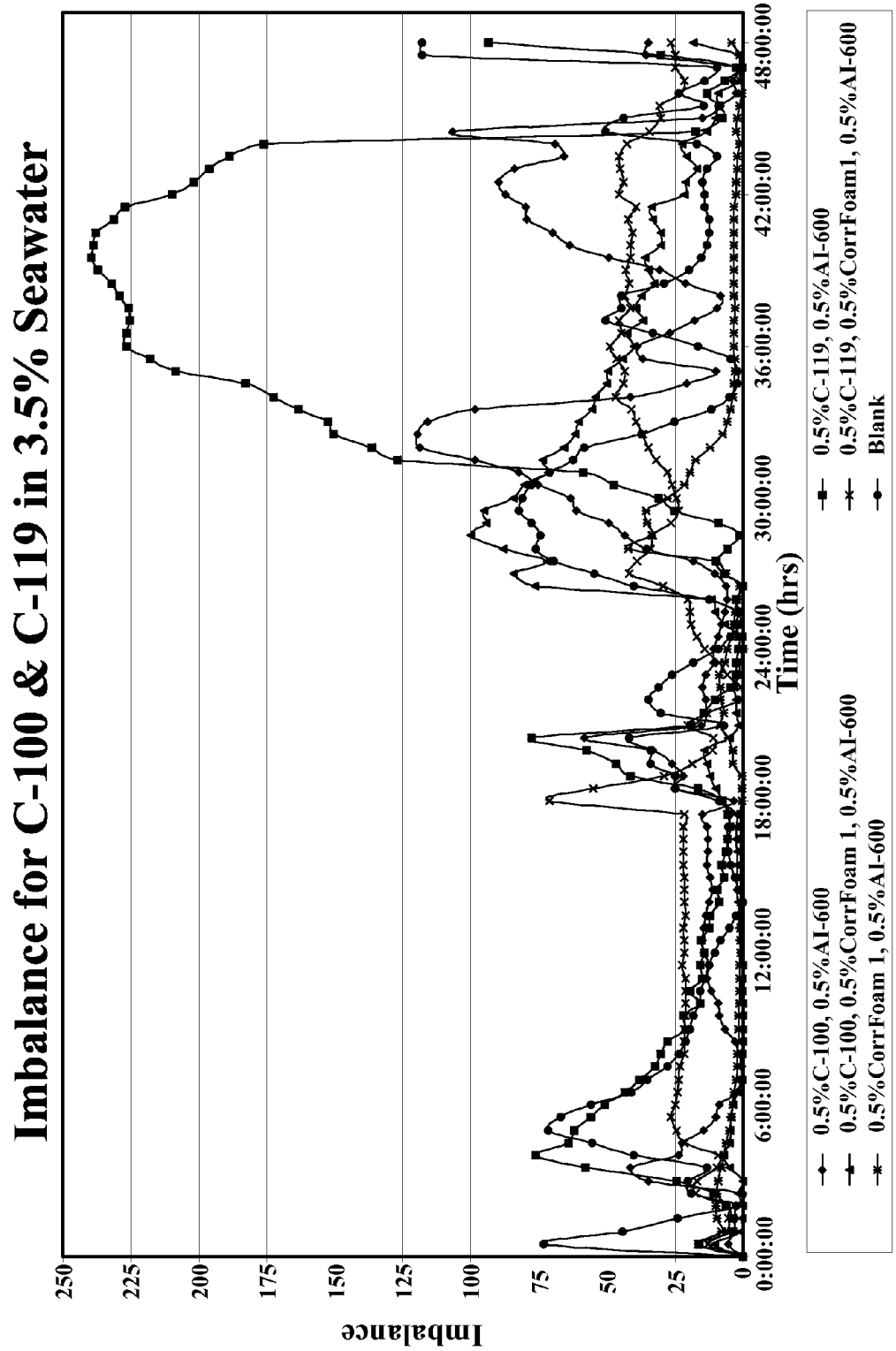
FIG. 1C depict photographs of an electrode before exposure to a corrosive environment (left) and after exposure to the corrosive environment (right)
FIG. 1D depicts a photograph of a treating solution into which the electrodes of FIG. 1C are placed and treated at a desired temperature.

The inventor has found that a new and stable corrosion inhibitor system can be prepared that finds applications in low, moderate and high temperature applications such as geothermal applications, oil field applications, power plant applications or other low, moderate and/or high temperature applications. The corrosion inhibitor systems include a combination of ingredients hithertobefore considered to be incapability, which combine to form a composition that has remarkable scale and corrosion inhibitory properties. The inventors have found that the corrosion control system of this invention can be used in all type of drilling fluids, completion fluids or production fluids including over-balanced and under-balanced fluids, in all type of geothermal systems, in one phase (water or oil) or mixed phase systems (e.g., biphasic system such as oil and water or triphasic systems composed of three distinct liquid phases) or in any other type of environment where corrosion control is a problem. In under-balanced applications, the agent that reduces the mass of the fluid can be air, nitrogen, carbon dioxide, membrane nitrogen or mixtures or combinations thereof.

The present invention broadly relates to a method for protecting metallic equipment from corrosion including the step of adding to a fluid in contact with the equipment a composition including an anionic oxygen inhibitor, a cationic acid inhibitor, and a noxious species and embrittlement inhibitor, where the composition protects the metallic equipment from corrosion and pitting at low, moderate and high temperatures. The compositions finds application in temperature applications in a range between about 250° F. and about 600° F.

The present invention broadly relates to a method for protecting metallic equipment from corrosion including the step of adding to a geothermal fluid in contact with the equipment a composition including an anionic oxygen inhibitor, a cationic acid inhibitor, and a noxious species and embrittlement inhibitor, where the composition protects the metallic equipment from corrosion and pitting at moderate and high temperatures. The compositions finds application in moderate to high temperature applications in a range between about 250° F. and about 600° F.

The present invention broadly relates to a method for protecting metallic equipment from corrosion including the step of adding to a geothermal fluid in contact with the equipment a composition including an anionic oxygen inhibitor, a cationic acid inhibitor, and a noxious species and embrittlement inhibitor, where the composition protects the metallic equipment from corrosion and pitting at high temperatures. The compositions finds application in high temperature applications from about 450° F. to about 600° F.

The present invention also broadly relates to a composition including an anionic oxygen inhibitor, a cationic acid inhibitor, and a noxious species and embrittlement inhibitor, where the composition protects the metallic equipment from corrosion and pitting at low, moderate and high temperatures.

The present invention also broadly relates to an aqueous-based, under-balanced or managed pressure drilling fluid including an effective amount of a composition including an anionic oxygen inhibitor, a cationic acid inhibitor, and a noxious species and embrittlement inhibitor, where the effective amount of the composition is sufficient to reduce corrosion and pitting of metal in contact with the drilling fluid during under-balanced drilling operations at low, moderate and high temperatures. The under-balanced drilling fluid includes at least water, a density reduction additive, and an effective amount of the composition. The drilling fluid can also include other additives such as a pH modifier, a $CO_2$ scavenger, a reactive shale and/or clay inhibitor, or combination thereof.

In one preferred embodiment of the corrosion control system of the invention, the corrosion control system includes from about 1.25 ppm to about 5 wt. % of a salt of a phosphate ester scale inhibitor, from about 0.25 wt. % to about 10 wt. % a cationic acid corrosion inhibitor, and from about 0.1 wt. % up to about a 10:1 ratio of a noxious sulfur species scavenger based on a concentration of the noxious sulfur species such as $H_2S$ in ppm in the fluid to be treated and a balance being deionized water. Optionally, the composition includes lime, a lime slurry, or hot lime from about 1 to 10 lbs per barrel, i.e., about 3.5 lbs per 350 lbs of composition or about 1 wt. %.

In another preferred embodiment of the corrosion control system of the invention, the corrosion control system includes from about 1.25 ppm to about 5 wt. % of a salt of a phosphate ester scale inhibitor, from about 0.25 wt. % to about 10 wt. % a cationic acid corrosion inhibitor, and from about 1.0 wt. % up to a balance of the composition in placed of water of a sulfur scavenger, where the sulfur scavenger comprises a solution of the sulfur scavenger in a solvent such as water. The solution can be from about 25 wt. % of the solvent to about 75 wt. % of the sulfur scavenger to about 75 wt. % of the solvent to about 25 wt. % of the sulfur scavenger. Optionally, the composition includes lime, a lime slurry, or hot lime from about 1 to 10 lbs per barrel, i.e., about 3.5 lbs per 350 lbs of composition or about 1 wt. %.

In another preferred embodiment of the corrosion control system of the invention, the corrosion control system includes from about 1.25 ppm to about 5 wt. % of a salt of a phosphate ester scale inhibitor, from about 0.25 wt. % to about 10 wt. % a cationic acid corrosion inhibitor, and from about 1.0 wt. % up to a balance of the composition in placed of water of a first sulfur scavenger, from about 0.1 wt. % up to 10:1 based on a concentration of $H_2S$ in ppm in the fluid to be treated of a second sulfur scavenger and a balance being deionized water, if the water is required. Of course, other solvent systems can be used as well such as an alcohol, an alcohol-water mixture, a glycol, a glycol-water mixture or other similar solvent system. Optionally, the composition includes lime, a lime slurry, or hot lime from about 1 to 10 lbs per barrel, i.e., about 3.5 lbs per 350 lbs of composition or about 1 wt. %.

In another preferred embodiment of the corrosion control system of the invention, the corrosion control system includes a reaction product of from about 1.25 ppm to about 5 wt. % of a salt of a phosphate ester scale inhibitor, from about 0.25 wt. % to about 10 wt. % a cationic acid corrosion inhibitor, and from about 0.1 wt. % up to about a 10:1 ratio of a noxious sulfur species scavenger based on a concentration of the noxious sulfur species such as $H_2S$ in ppm in the fluid to be treated and a balance being deionized water and optionally, lime, a lime slurry, or hot lime from about 1 to 10 lbs per barrel, i.e., about 3.5 lbs per 350 lbs of composition or about 1 wt. % heated to a temperature of at least 120° F. In another embodiment, the above composition is heated to a temperature of at least 200° F. In another embodiment, the above composition is heated to a temperature of at least 300° F. In another embodiment, the above composition is heated to a temperature of at least 400° F. In another embodiment, the above composition is heated to a temperature of at least 450° F. In another embodiment, the above composition is heated to a temperature of at least 500° F.

In another preferred embodiment of the corrosion control system of the invention, the corrosion control system includes a reaction product of from about 1.25 ppm to about 5 wt. % of a salt of a phosphate ester scale inhibitor, from about 0.25 wt. % to about 10 wt. % a cationic acid corrosion inhibitor, and from about 1.0 wt. % up to a balance of the composition in placed of water of a sulfur scavenger, where the sulfur scavenger comprises a solution of the sulfur scavenger in a solvent such as water. The solution can be from about 25 wt. % of the solvent to about 75 wt. % of the sulfur scavenger to about 75 wt. % of the solvent to about 25 wt. % of the sulfur scavenger and optionally, lime, a lime slurry, or hot lime from about 1 to 10 lbs per barrel, i.e., about 3.5 lbs per 350 lbs of composition or about 1 wt. % heated to a temperature of at least 120° F. In another embodiment, the above composition is heated to a temperature of at least 200° F. In another embodiment, the above composition is heated to a temperature of at least 300° F. In another embodiment, the above composition is heated to a temperature of at least 400° F. In another embodiment, the above composition is heated to a temperature of at least 450° F. In another embodiment, the above composition is heated to a temperature of at least 500° F.

In another preferred embodiment of the corrosion control system of the invention, the corrosion control system includes a reaction product of from about 1.25 ppm to about 5 wt. % of a salt of a phosphate ester scale inhibitor, from about 0.25 wt. % to about 10 wt. % a cationic acid corrosion inhibitor, and from about 1.0 wt. % up to a balance of the composition in placed of water of a first sulfur scavenger, from about 0.1 wt. % up to 10:1 based on a concentration of $H_2S$ in ppm in the fluid to be treated of a second sulfur scavenger and a balance being deionized water, if the water is required and optionally, lime, a lime slurry, or hot lime from about 1 to 10 lbs per barrel, i.e., about 3.5 lbs per 350 lbs of composition or about 1 wt. % heated to a temperature of at least 120° F. In another embodiment, the above composition is heated to a temperature of at least 200° F. In another embodiment, the above composition is heated to a temperature of at least 300° F. In another embodiment, the above composition is heated to a temperature of at least 400° F. In another embodiment, the above composition is heated to a temperature of at least 450° F. In another embodiment, the above composition is heated to a temperature of at least 500° F. Of course, other solvent systems can be used as well such as an alcohol, an alcohol-water mixture, a glycol, a glycol-water mixture or other similar solvent system.

In a preferred embodiment of drilling fluids of this invention, the drilling fluids are designed for under-balanced or managed pressure drilling, completion, production or related operations performed in an under-balanced or managed pressure condition include from about 0.1% v/v to about 10.0% v/v of a foamer or other density reduction additive, from about 0.1% v/v to about 5% v/v of a corrosion control system of this invention, from about 0.1% v/v to about 10.0% v/v of a choline salt solution and the remainder being water, where the choline salt solution is generally about 70 wt. % of the choline salt with remainder being water. Generally, the resulting drilling fluid is pH adjusted by the addition of a sufficient amount of pH modifier to adjust the pH to about 10. A preferred embodiment of the drilling fluids of this invention includes from about 0.2% v/v to about 5.0% v/v of a foamer or other density reduction additive, from about 0.1% v/v to about 2.0% v/v of a corrosion control system of this invention, from about 0.1% v/v to about 5.0% v/v of a choline salt solution and the remainder being water, where the choline salt solution is generally about 70 wt. % of the choline salt with remainder being water. Another preferred embodiment of the drilling fluids of this invention includes from about 0.2% v/v to about 4.0% v/v of a foamer or other density reduction additive, from about 0.1% v/v to about 1.0% v/v of a corrosion control system of this invention, from about 0.1% v/v to about 3.0% v/v of a choline salt solution and the remainder being water, where the choline salt solution is generally about 70 wt. % of the choline salt with remainder being water.

One preferred method of this invention includes the step of adding an effective amount of a composition of this invention to a fluid in contact with metallic surfaces, where the effective amount is sufficient to reduce acid, noxious species, oxygen or other types of corrosion. The compositions are effective in reducing corrosion as much as an order of magnitude as compared to corrosion systems not including a phosphate ester scale inhibitor, a cationic acid inhibitor and a sulfur scavenger.

Another preferred method of this invention includes the step of combining a scale inhibitor, a noxious species inhibitor or scavenger and an acid inhibitor or scavenger and heating the combination to a temperature sufficient to form a high-temperature corrosion control system of this invention. While not meaning to be bound to a given theory, the inventors speculate that the three components undergo a molecular conversion where the phosphate ester salts react with either or both of the other components to form a new, effective high-temperature corrosion control system.

Suitable Reagents for Use in the Invention

Phosphate Ester Salts

Suitable phosphate ester salts for use in this invention include, without limitation, alkali, alkaline earth metal, or transition metal salts of alkyl phosphate ester, alkoxy phosphate esters, glycols phosphate esters, alkylpolyol phosphate esters or the like or mixture or combinations thereof. Exemplary examples of glycol phosphate esters include, without limitation, ethylene glycol (EG), propylene glycol, butylene glycol, hexylene glycol, trimethylol propane, pentaeryithrol, neopentyl glycol or the like or mixtures or combinations thereof.

Sulfur Scavenger

Suitable sulfur scavengers for use in this invention include, without limitation, amines, aldehyde-amine adducts, triazines, or the like or mixtures or combinations thereof. Exemplary examples of aldehyde-amine adduct type sulfur scavengers include, without limitation, (1) formaldehyde reaction products with primary amines, secondary amines, tertiary amines, primary diamines, secondary diamines, tertiary diamines, mixed diamines (diamines having mixtures of primary, secondary and tertiary amines), primary polyamines, secondary polyamines, tertiary polyamines, mixed polyamines (polyamines having mixtures of primary, secondary and tertiary amines), monoalkanolamines, dialkanol amines and trialkanol amines; (2) linear or branched alkanal (i.e., RCHO, where R is a linear or branched alkyl group having between about 1 and about 40 carbon atoms or mixtures of carbon atoms and heteroatoms such as O and/or N) reaction products with primary amines, secondary amines, tertiary amines, primary diamines, secondary diamines, tertiary diamines, mixed diamines (diamines having mixtures of primary, secondary and tertiary amines), primary polyamines, secondary polyamines, tertiary polyamines, mixed polyamines (polyamines having mixtures of primary, secondary and tertiary amines), monoalkanolamines, dialkanol amines and trialkanol amines; (3) aranals (R'CHO, where R' is an aryl group having between about 5 and about 40 carbon atoms and heteroatoms such as O and/or N) reaction products with primary amines, secondary amines, tertiary amines, primary diamines, secondary diamines, tertiary diamines, mixed diamines (diamines having mixtures of primary, secondary and tertiary amines), primary polyamines, secondary polyamines, tertiary polyamines, mixed polyamines (polyamines having mixtures of primary, secondary and tertiary amines), monoalkanolamines, dialkanol amines and trialkanol amines; (4) alkaranals (R"CHO, where R" is an alkylated aryl group having between about 6 and about 60 carbon atoms and heteroatoms such as O and/or N) reaction products with primary amines, secondary amines, tertiary amines, primary diamines, secondary diamines, tertiary diamines, mixed diamines (diamines having mixtures of primary, secondary and tertiary amines), primary polyamines, secondary polyamines, tertiary polyamines, mixed polyamines (polyamines having mixtures of primary, secondary and tertiary amines), monoalkanolamines, dialkanol amines and trialkanol amines; (5) aralkanals (R'''CHO, where R''' is an aryl substituted linear or branched alkyl group having between about 6 and about 60 carbon atoms and heteroatoms such as O and/or N) reaction products with primary amines, secondary amines, tertiary amines, primary diamines, secondary diamines, tertiary diamines, mixed diamines (diamines having mixtures of primary, secondary and tertiary amines), primary polyamines, secondary polyamines, tertiary polyamines, mixed polyamines (polyamines having mixtures of primary, secondary and tertiary amines), monoalkanolamines, dialkanol amines and trialkanol amines, and (6) mixtures or combinations thereof. It should be recognized that under certain reaction conditions, the reaction mixture may include triazines in minor amount or as substantially the only reaction product (greater than 90 wt. % of the product), while under other conditions the reaction product can be monomeric, oligomeric, polymeric, or mixtures or combinations thereof. Other sulfur scavengers are disclosed in WO04/043038, US2003-0089641, GB2397306, U.S. patent application Ser. Nos.: 10/754,487, 10/839,734, and 10/734,600, incorporated herein by reference.

Shale Inhibitors

Suitable choline salts or 2-hydroxyethyl trimethylammonium salts for use in this invention include, without limitation, choline organic counterion salts, choline inorganic counterion salts, or mixture or combinations thereof. Preferred choline counterion salts of this invention include, without limitation, choline or 2-hydroxyethyl trimethylammonium halide counterion salts, carboxylate counterion salts, nitrogen oxide counterion salts, phosphorus oxide counterion salts, sulfur oxide counterion salts, halogen oxide counterion salts, metal oxide counterion salts, carbon oxide counterion salts, boron oxide counterion salts, perfluoro counterion salts, hydrogen oxide counterion salts or mixtures or combinations thereof. Other examples can be found in U.S. patent application Ser. No. 10/999,796, incorporated herein by reference.

Exemplary examples of choline halide counterion salts including choline fluoride, choline chloride, choline bromide, choline iodide, or mixtures or combinations thereof.

Suitable choline carboxylate counterion salts include, without limitation, choline carboxylate counterion salts where the carboxylate counterion is of the general formula $R^1COO^-$, where $R^1$ is an alkyl group, alkenyl group, alkynyl group, an aryl group, an alkaryl group, an aralkyl group, alkenylaryl group, aralkenyl group, alkynylaryl group, aralkynyl group hetero atom analogs, where the hetero atom is selected from the group consisting of boron, nitrogen, oxygen, fluorine, phosphorus, sulfur, chlorine, bromine, iodine, and mixture or combinations thereof, or mixtures or combinations thereof. A non-exhaustive list of exemplary examples of choline carboxylate counterion salts include choline formate, choline acetate, choline propanate, choline butanate, cholide pentanate, choline hexanate, choline heptanate, choline octanate, choline nonanate, choline decanate, choline undecanate, choline dodecanate, and choline higher linear carboxylate salts, choline benzoate, choline salicylate, other choline aromatic carboxylate counterion salts, choline stearate, choline oleate, other choline fatty acid counterion salts, choline glyolate, choline lactate, choline hydroxylacetate, choline citrate, other choline hydroxylated carboxylates counterion salts, choline aconitate, choline cyanurate, choline oxalate, choline tartarate, choline itaconate, other choline di, tri and polycarboxylate counterion salts, choline trichloroacetate, choline trifluoroacetate, other choline halogenated carboxylate counterion salts, or mixture or combinations thereof. Other choline carboxylate counterion salts useful in the drilling fluids of this invention include choline amino acid counterion salts including choline salts of all naturally occurring and synthetic amino acids such as alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine, (R)-Boc-4-(4-pyridyl)-β-Homoala-OH purum, (S)-Boc-4-(4-pyridyl)-β-Homoala-OH purum, (R)-Boc-4-trifluoromethyl-β-Homophe-OH purum, (S)-Fmoc-3-trifluoromethyl-β-Homophe-OH purum, (S)-Boc-3-trifluoromethyl-β-Homophe-OH purum, (S)-Boc-2-trifluoromethyl-β-Homophe-OH purum, (S)-Fmoc-4-chloro-β-Homophe-OH purum, (S)-Boc-4-methyl-β-Homophe-OH purum, 4-(Trifluoromethyl)-L-phenylalanine purum, 2-(Trifluoromethyl)-D-phenylalanine purum, 4-(Trifluoromethyl)-D-phenylalanine purum, 3-(2-Pyridyl)-L-alanine purum, 3-(2-Pyridyl)-L-alanine purum, 3-(3-Pyridyl)-L-alanine purum, or mixtures or combinations thereof or mixtures or combinations of these amino acid choline salts with other choline salts. Other preferred carboxylate counterions are counterions formed from a reaction of a carboxylic acid or carboxylate salt with an alkenyl oxide to form a carboxylate polyalkylene oxide alkoxide counterion salt. Preferred alkenyl oxides include ethylene oxide, propylene oxide, butylene oxide, and mixtures and/or combinations thereof.

Exemplary examples of choline nitrogen oxide counterion salts including choline nitrate, choline nitrite, choline $N_xO_y$, counterion salts or mixtures or combinations thereof.

Exemplary examples of choline phosphorus oxide counterion salts include choline phosphate, choline phosphite, choline hydrogen phosphate, choline dihydrogen phosphate, choline hydrogen phosphite, choline dihydrogen phosphite, or mixtures or combinations thereof.

Exemplary examples of choline sulfur oxide counterion salts include choline sulfate, choline hydrogen sulfate, choline persulfate, choline alkali metal sulfates, choline alkaline earth metal sulfates, choline sulfonate, choline alkylsulfonates, choline sulfamate ($NH_2SO_3^-$), choline taurinate ($NH_2CH_2CH_2SO_3^-$), or mixtures or combinations thereof.

Exemplary examples of choline halogen oxide counterion salts including choline chlorate, choline bromate, choline iodate, choline perchlorate, choline perbromate, choline periodate, or mixtures or combinations thereof.

Exemplary examples of choline metal oxide counterion salts including choline dichromate, choline iron citrate, choline iron oxalate, choline iron sulfate, choline tetrathiocyanatodiamminechromate, choline tetrathiomolybdate, or mixtures or combinations thereof.

Exemplary examples of choline carbon oxide counterion salts include choline carbonate, choline bicarbonate, choline alkali carbonates, choline alkaline earth metal carbonates, or mixtures or combinations thereof.

Exemplary examples of choline boron oxide counterion salts including choline borate, tetraphenyl borate, or mixtures or combinations thereof.

Exemplary examples of choline perfluoro counterion salts including choline tetrafluoroborate, choline hexafluoroantimonate, choline heptafluorotantalate(V), choline hexafluorogermanate(IV), choline hexafluorophsophate, choline hexafluorosilicate, choline hexafluorotitanate, choline metavanadate, choline metatungstate, choline molybdate, choline phosphomolybdate, choline trifluoroacetate, choline trifluoromethanesulfonate, or mixtures or combinations thereof.

Exemplary examples of choline hydrogen oxide counterion salts including choline hydroxide, choline peroxide, choline superoxide, mixtures or combinations thereof. hydroxide reacted with: formic acid; acetic acid; phosphoric acid; hydroxy acetic acid; nitric acid; nitrous acid; poly phos; derivatives of $P_2O_5$; acid; (acid of glyoxal); sulfuric; all the amino acids (lycine, torine, glycine, etc.); $NH_2CH_2CH_2SO_3H$; sulfamic; idodic; all the fatty acids; diamethylol proprionic acid; cyclolaucine; phosphorous; boric; proline; benzoic acid; tertiary chloro acetic; fumeric; salicylic; choline derivatives; ethylene oxide; propylene oxide; butylene oxide; epilene chloro hydrine; ethylene chloro hydrine; choline carbonate; and choline peroxide.

One preferred class of choline salts of this invention is given by the general formula (I):

$$HOCH_2CH_2N^+(CH_3)_3 \cdot R^1COO^- \qquad (I)$$

where $R^1$ is an alkyl group, alkenyl group, alkynyl group, an aryl group, an alkaryl group, an aralkyl group, alkenylaryl group, aralkenyl group, alkynylaryl group, aralkynyl group hetero atom analogs, where the hetero atom is selected from the group consisting of boron, nitrogen, oxygen, fluorine, phosphorus, sulfur, chlorine, bromine, iodine, and mixture or combinations thereof, or mixtures or combinations thereof.

While choline halides have been used in drilling, completion and production operations under over-balanced conditions, choline carboxylate salts have not been used in such applications. These new anti-swell additives should enjoy broad utility in all conventional drilling, completion and/or production fluids.

pH Modifiers

Suitable pH modifiers for use in this invention include, without limitation, alkali hydroxides, alkali carbonates, alkali bicarbonates, alkaline earth metal hydroxides, alkaline earth metal carbonates, alkaline earth metal bicarbonates and mixtures or combinations thereof. Preferred pH modifiers include NaOH, KOH, Ca(OH)$_2$, CaO, Na$_2$CO$_3$, KHCO$_3$, K$_2$CO$_3$, NaHCO$_3$, MgO, Mg(OH)$_2$ and combination thereof.

Weight Reducing Agents and Foamers

The weight reducing agents and foamers use for this invention include, without limitation, any weight reducing agent or foamer currently available or that will be come available during the life time of this patent application or patent maturing therefrom. Preferred foamers are those available from Weatherford International, Inc. facility in Elmendorf, Tex. Generally, the foamers used in this invention can include alone or in any combination an anionic surfactant, a cationic surfactant, a non-ionic surfactant and a zwitterionic surfactant. Preferred foaming agents includes those disclosed in co-pending U.S. patent application Ser. No. 10/839,734 filed May 5, 2004.

Other Corrosion Inhibitors

Suitable corrosion inhibitor for use in this invention include, without limitation: quaternary ammonium salts e.g., chloride, bromides, iodides, dimethylsulfates, diethylsulfates, nitrites, hydroxides, alkoxides, or the like, or mixtures or combinations thereof; salts of nitrogen bases; or mixtures or combinations thereof. Exemplary quaternary ammonium salts include, without limitation, quaternary ammonium salts from an amine and a quaternarization agent, e.g., alkylchlorides, alkylbromide, alkyl iodides, alkyl sulfates such as dimethyl sulfate, diethyl sulfate, etc., dihalogenated alkanes such as dichloroethane, dichloropropane, dichloroethyl ether, epichlorohydrin adducts of alcohols, ethoxylates, or the like; or mixtures or combinations thereof and an amine agent, e.g., alkylpyridines, especially, highly alkylated alkylpyridines, alkyl quinolines, C6 to C24 synthetic tertiary amines, amines derived from natural products such as coconuts, or the like, dialkylsubstituted methyl amines, amines derived from the reaction of fatty acids or oils and polyamines, amidoimidazolines of DETA and fatty acids, imidazolines of ethylenediamine, imidazolines of diaminocyclohexane, imidazolines of aminoethylethylenediamine, pyrimidine of propane diamine and alkylated propene diamine, oxyalkylated mono and polyamines sufficient to convert all labile hydrogen atoms in the amines to oxygen containing groups, or the like or mixtures or combinations thereof. Exemplary examples of salts of nitrogen bases, include, without limitation, salts of nitrogen bases derived from a salt, e.g.: C1 to C8 monocarboxylic acids such as formic acid, acetic acid, propanoic acid, butanoic acid, pentanoic acid, hexanoic acid, heptanoic acid, octanoic acid, 2-ethylhexanoic acid, or the like; C2 to C12 dicarboxylic acids, C2 to C12 unsaturated carboxylic acids and anhydrides, or the like; polyacids such as diglycolic acid, aspartic acid, citric acid, or the like; hydroxy acids such as lactic acid, itaconic acid, or the like; aryl and hydroxy aryl acids; naturally or synthetic amino acids; thioacids such as thioglycolic acid (TGA); free acid forms of phosphoric acid derivatives of glycol, ethoxylates, ethoxylated amine, or the like, and aminosulfonic acids; or mixtures or combinations thereof and an amine, e.g.: high molecular weight fatty acid amines such as cocoamine, tallow amines, or the like; oxyalkylated fatty acid amines; high molecular weight fatty acid polyamines (di, tri, tetra, or higher); oxyalkylated fatty acid polyamines; amino amides such as reaction products of carboxylic acid with polyamines where the equivalents of carboxylic acid is less than the equivalents of reactive amines and oxyalkylated derivatives thereof; fatty acid pyrimidines; monoimidazolines of EDA, DETA or higher ethylene amines, hexamethylene diamine (HMDA), tetramethylenediamine (TMDA), and higher analogs thereof; bisimidazolines, imidazolines of mono and polyorganic acids; oxazolines derived from monoethanol amine and fatty acids or oils, fatty acid ether amines, mono and bis amides of aminoethylpiperazine; GAA and TGA salts of the reaction products of crude tall oil or distilled tall oil with diethylene triamine; GAA and TGA salts of reaction products of dimer acids with mixtures of poly amines such as TMDA, HMDA and 1,2-diaminocyclohexane; TGA salt of imidazoline derived from DETA with tall oil fatty acids or soy bean oil, canola oil, or the like; or mixtures or combinations thereof.

Other Additives

The drilling fluids of this invention can also include other additives as well such as scale inhibitors, carbon dioxide control additives, paraffin control additives, oxygen control additives, or other additives.

Scale Control

Suitable additives for Scale Control and useful in the compositions of this invention include, without limitation: Chelating agents, e.g., Na, K or NH$_4^+$ salts of EDTA; Na, K or NH$_4^+$ salts of NTA; Na, K or NH$_4^+$ salts of Erythorbic acid; Na, K or NH$_4^+$ salts of thioglycolic acid (TGA); Na, K or NH$_4^+$ salts of Hydroxy acetic acid; Na, K or NH$_4^+$ salts of Citric acid; Na, K or NH$_4^+$ salts of Tartaric acid or other similar salts or mixtures or combinations thereof. Suitable additives that work on threshold effects, sequestrants, include, without limitation: Phosphates, e.g., sodium hexametaphosphate, linear phosphate salts, salts of polyphosphoric acid, Phosphonates, e.g., nonionic such as HEDP (hydroxythylidene diphosphoric acid), PBTC (phosphoisobutane, tricarboxylic acid), Amino phosphonates of: MEA (monoethanolamine), NH$_3$, EDA (ethylene diamine), Bishydroxyethylene diamine, Bisaminoethylether, DETA (diethylenetriamine), HMDA (hexamethylene diamine), Hyper homologues and isomers of HMDA, Polyamines of EDA and DETA, Diglycolamine and homologues, or similar polyamines or mixtures or combinations thereof; Phosphate esters, e.g., polyphosphoric acid esters or phosphorus pentoxide (P$_2$O$_5$) esters of: alkanol amines such as MEA, DEA, triethanol amine (TEA), Bishydroxyethylethylene diamine; ethoxylated alcohols, glycerin, Tris & Tetrahydroxy amines; ethoxylated alkyl phenols (limited use due to toxicity problems), Ethoxylated amines such as monoamines such as MDEA and higher amines from 2 to 24 carbons atoms, diamines 2 to 24 carbons carbon atoms, or the like; Polymers, e.g., homopolymers of aspartic acid, soluble homopolymers of acrylic acid, copolymers of acrylic acid and methacrylic acid, terpolymers of acylates, AMPS, etc., hydrolyzed polyacrylamides, poly malic anhydride (PMA); or the like; or mixtures or combinations thereof.

Carbon Dioxide Neutralization

Suitable additives for $CO_2$ neutralization and for use in the compositions of this invention include, without limitation, MEA, DEA, isopropylamine, cyclohexylamine, morpholine, diamines, dimethylaminopropylamine (DMAPA), ethylene diamine, methoxy proplyamine (MOPA), dimethylethanol amine, methyldiethanolamine (MDEA) & oligomers, imidazolines of EDA and homologues and higher adducts, imidazolines of aminoethylethanolamine (AEEA), aminoethylpiperazine, aminoethylethanol amine, di-isopropanol amine, DOW AMP-90™, Angus AMP-95, dialkylamines (of methyl, ethyl, isopropyl), mono alkylamines (methyl, ethyl, isopropyl), trialkyl amines (methyl, ethyl, isopropyl), bishydroxyethylethylene diamine (THEED), or the like or mixtures or combinations thereof.

Paraffin Control

Suitable additives for Paraffin Removal, Dispersion, and/or paraffin Crystal Distribution include, without limitation: Cellosolves available from DOW Chemicals Company; Cellosolve acetates; Ketones; Acetate and Formate salts and esters; surfactants composed of ethoxylated or propoxylated alcohols, alkyl phenols, and/or amines; methylesters such as coconate, laurate, soyate or other naturally occurring methylesters of fatty acids; sulfonated methylesters such as sulfonated coconate, sulfonated laurate, sulfonated soyate or other sulfonated naturally occurring methylesters of fatty acids; low molecular weight quaternary ammonium chlorides of coconut oils soy oils or C10 to C24 amines or monohalogenated alkyl and aryl chlorides; quanternary ammonium salts composed of disubstituted (e.g., dicoco, etc.) and lower molecular weight halogenated alkyl and/or aryl chlorides; gemini quaternary salts of dialkyl (methyl, ethyl, propyl, mixed, etc.) tertiary amines and dihalogenated ethanes, propanes, etc. or dihalogenated ethers such as dichloroethyl ether (DCEE), or the like; gemini quaternary salts of alkyl amines or amidopropyl amines, such as cocoamidopropyldimethyl, bis quaternary ammonium salts of DCEE; or mixtures or combinations thereof. Suitable alcohols used in preparation of the surfactants include, without limitation, linear or branched alcohols, specially mixtures of alcohols reacted with ethylene oxide, propylene oxide or higher alkyleneoxide, where the resulting surfactants have a range of HLBs. Suitable alkylphenols used in preparation of the surfactants include, without limitation, nonylphenol, decylphenol, dodecylphenol or other alkylphenols where the alkyl group has between about 4 and about 30 carbon atoms. Suitable amines used in preparation of the surfactants include, without limitation, ethylene diamine (EDA), diethylenetriamine (DETA), or other polyamines. Exemplary examples include Quadrols, Tetrols, Pentrols available from BASF. Suitable alkanolamines include, without limitation, monoethanolamine (MEA), diethanolamine (DEA), reactions products of MEA and/or DEA with coconut oils and acids and/or N-methyl-2-pyrrolidone is oil solubility is desired.

Oxygen Control

The introduction of water downhole often is accompanied by an increase in the oxygen content of downhole fluids due to oxygen dissolved in the introduced water. Thus, the materials introduced downhole must work in oxygen environments or must work sufficiently well until the oxygen content has been depleted by natural reactions. For system that cannot tolerate oxygen, then oxygen must be removed or controlled in any material introduced downhole. The problem is exacerbated during the winter when the injected materials include winterizers such as water, alcohols, glycols, Cellosolves, formates, acetates, or the like and because oxygen solubility is higher to a range of about 14-15 ppm in very cold water. Oxygen can also increase corrosion and scaling. In CCT (capillary coiled tubing) applications using dilute solutions, the injected solutions result in injecting an oxidizing environment ($O_2$) into a reducing environment ($CO_2$, $H_2S$, organic acids, etc.).

Options for controlling oxygen content includes: (1) de-aeration of the fluid prior to downhole injection, (2) addition of normal sulfides to product sulfur oxides, but such sulfur oxides can accelerate acid attack on metal surfaces, (3) addition of erythorbates, ascorbates, diethylhydroxyamine or other oxygen reactive compounds that are added to the fluid prior to downhole injection; and (4) addition of corrosion inhibitors or metal passivation agents such as potassium (alkali) salts of esters of glycols, polyhydric alcohol ethyloxylates or other similar corrosion inhibitors. Exemplary examples oxygen and corrosion inhibiting agents include mixtures of tetramethylene diamines, hexamethylene diamines, 1,2-diaminecyclohexane, amine heads, or reaction products of such amines with partial molar equivalents of aldehydes. Other oxygen control agents include salicylic and benzoic amides of polyamines, used especially in alkaline conditions, short chain acetylene diols or similar compounds, phosphate esters, borate glycerols, urea and thiourea salts of bisoxalidines or other compound that either absorb oxygen, react with oxygen or otherwise reduce or eliminate oxygen.

Salt Inhibitors

Suitable salt inhibitors for use in the fluids of this invention include, without limitation, Na Minus—Nitrilotriacetamide available from Clearwater International, LLC of Houston, Tex.

Advantages of the Anti-Swelling Additives of this Invention

The present invention differs from the compositions and methods of U.S. Pat. No. 5,635,458 in that this patent teaches the use of choline chloride in a convention drilling fluid. Unlike under-balanced drilling fluids, convention drilling fluid or so-called over-balanced drilling fluids drill through a reservoir at hydrostatic pressures higher than the hydrostatic pressures of the formation and require filtration control agents and viscosifiers. These two components in conjunction with a weighing agent are required to establish an impermeable filter-cake on face of the formation preventing losses of the drilling fluid to the formation. In under-balanced drilling, these components are not required since the hydrostatic formation pressure is higher than the hydrostatic pressure of the drilling fluid because no filter-cake need be established and no or very little of the drilling fluid penetrates the formation.

The present invention differs from the compositions and methods of U.S. Pat. No. 5,908,814, as is in U.S. Pat. No. 5,635,458, where it teaches the use of choline chloride in conventional over-balanced drilling fluid. U.S. Pat. No. 6,247,543 also teaches the use of choline chloride in conventional over-balanced drilling fluid.

Conventional Drilling Fluids with the Choline Carboxylates of this Invention

It is essential that the drilling fluid ultimately selected and formulated for use in any particular well application be appropriate for the conditions of the well. Therefore, although the base ingredients remain the same, i.e., salt or fresh water and the drilling fluid additives of this invention, other components can be added.

Specifically, materials generically referred to as gelling materials, thinners, fluid loss control agents, and weight materials are typically added to water base drilling fluid formulations. Of these additional materials, each can be added to the formulation in a concentration as rheologically and functionally required by drilling conditions. Typical gelling materials used in aqueous based drilling fluids are bentonite, sepiolite, and attapulgite clays and anionic high-molecular weight, water-soluble polymers such as partially hydrolyzed polyacrylamides.

An important aspect of the present invention is the presence of a weight material in the drilling fluid. Materials that have demonstrated utility as weight materials include Galena (PbS), Hematite ($Fe_2O_3$), Magnetite ($Fe_3O_4$), iron oxide ($Fe_2O_3$) (manufactured), Illmenite ($FeO.TiO_2$), Barite ($BaSO_4$), Siderite ($FeCO_3$), Celestite ($SrSO_4$), Dolomite ($CaCO_3MgCO_3$), and Calcite ($CaCO_3$). The weight material is added to the drilling fluid in a functionally effective amount largely dependent on the nature of the formation being drilled. Weight materials are typically present only in drilling fluids and are not generally found in well treatment and stimulation fluids such as fracturing fluids. In fracturing fluids the use of weight materials is specifically avoided for functional reasons.

Similarly, it has been found beneficial to add lignosulfonates as thinners for water-base drilling fluids. Typically lignosulfonates, modified lignosulfonates, polyphosphates and tannins are added. In other embodiments, low molecular weight polyacrylates can also be added as thinners. Thinners are added to a drilling fluid to reduce flow resistance and control gelation tendencies. Other functions performed by thinners include reducing filtration and cake thickness, counteracting the effects of salts, minimizing the effects of water on the formations drilled, emulsifying oil in water, and stabilizing mud properties at elevated temperatures.

As mentioned previously, the drilling fluid composition of this invention contains a weight material. The quantity depends upon the desired density of the final composition. The most preferred weight materials include, but are not limited to, barite, hematite calcium carbonate, magnesium carbonate and the like.

Finally, anionic fluid loss control agents such as modified lignite, polymers, modified starches and modified celluloses can be added to the water base drilling fluid system of this invention.

As indicated, the additives of the invention are selected to have low toxicity and to be compatible with common anionic drilling fluid additives such as polyanionic carboxymethylcellulose (PAC or CMC), polyacrylates, partially-hydrolyzed polyacrylamides (PHPA), lignosulfonates, xanthan gum, etc.

Several preferred embodiments of the invention were prepared for use in the following examples. The several samples of condensates were prepared using various catalysts, as noted.

Triethanolaminemethyl chloride was prepared by mixing 60 grams of triethanolamine with 20 grams of distilled water. 20 grams of methyl chloride was then added to the solution. The solution was heated at about 65° C. for approximately 6 hours. Upon completion of the reaction the excess methyl chloride was evaporated.

In an alternative embodiment, an improved drilling fluid additive was formed by reacting triethanolamine with N,N,N-trimethyl-2-hydroxy-3-chloropropane ammonium chloride to form a water soluble diquat. The reaction was conducted generally according to the procedure set forth above for the preparation of the triethanolaminemethyl chloride.

Condensates of triethanolamine were prepared using various catalysts, followed by quaternization of the condensates. In general, the condensate samples were prepared by mixing 200 grams of triethanolamine with 1 to 10% of the catalyst by weight. The catalysts employed in preparing the samples were sodium hydroxide, zinc chloride and calcium chloride.

Generally, the mixtures were heated between about 100° C. to about 250° C. for several hours until the desired condensation was achieved. The condensation water was distilled off during the reaction. The triethanolamine condensates were then quaternized according to the procedure set forth for the preparation of the triethanolaminemethyl chloride described above.

The simple glycols are useful for lowering water activity and freezing point of an aqueous solution. At moderate concentrations, they can lower the water activity to a level equal to or less than that of most gumbo shales commonly encountered in offshore drilling. This lowering of water activity aids in preventing water adsorption through osmotic effects. The lowering of the freezing point can be utilized to prevent the formation of gas hydrates in deep water drilling while eliminating the use of large amounts of salts.

The water-based drilling fluid system of this invention comprises a water-miscible glycol with a molecular weight of less than about 200, such as ethylene glycol, diethylene glycol, triethylene glycol, propylene glycol, butylene glycol and mixtures thereof, in a range from 30% to 70% by weight, preferably 30% to 50% by weight of the aqueous phase of the said drilling fluid. Incorporated in the aqueous phase of the drilling fluid is an organic cationic material selected from the group consisting of choline hydroxide, choline chloride, choline carbonate, choline bicarbonate, choline sulfate and mixtures thereof, or an organic potassium salt such as potassium acetate or potassium formate, preferably choline chloride, in a range from 3% by weight up to saturation, preferably 5% to 20% by weight of the aqueous phase.

A filtration control agent may be added to control the fluid loss of the drilling fluid. Suitable filtration control agents are well known in the art and may include but are not limited to polyanionic cellulose, polyacrylate, polysaccharide, lignite, lignosulfonate, and mixtures thereof.

A viscosifier, such as biopolymers, clays and mixtures thereof, also may be added to increase viscosity and suspend solids and weighting materials.

The density of the drilling fluids can be adjusted by using barite, hematite, calcium carbonate, and mixtures thereof.

To minimize solubilization problems of polymer additives that may be encountered at high concentrations of glycol, the filtration control agent and viscosifier should be pre-solubilized in water before the addition of glycol.

The present invention is directed to a water-base drilling fluid for use in drilling wells through a formation containing a shale which swells in the presence of water. Generally the drilling fluid of the present invention includes a weight material, a shale hydration inhibition agent and an aqueous continuous phase. As disclosed below, the drilling fluids of the present invention may also include additional components, such as fluid loss control agents, bridging agents, lubricants, anti-bit balling agents, corrosion inhibition agents, surfactants and suspending agents and the like which may be added to an aqueous based drilling fluid.

The shale hydration inhibition agent of the present invention is preferably a polyoxyalkyleneamine which inhibits the swelling of shale that may be encountered during the drilling process. Preferably the alkylene group is a propylene, thus the shale inhibition agents of the present invention may be selected from the general group of polyoxypropyleneamines. While a variety of members of this group may serve as shale inhibition agents, we have found that compounds having the general formula

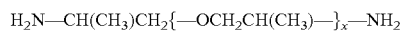

provide effective inhibition of shale hydration.

The value of x has been found to be a factor in the ability of the shale hydration inhibitors to carry out their desired role. The value of x may be a whole number or fractional number that reflects the average molecular weight of the compound. In one embodiment of the present invention x may have a value less than 15 and preferably have a value between about 1 and about 5. In one particularly preferred embodiment, the value of x has an average number of about 2.6.

Alternatively and in another embodiment of the present invention, the value of x is determined by the molecular weight of the shale hydration inhibition agent. Thus x is selected such that the average molecular weight of the hydration inhibition agent is from about 132 to about 944 and preferably x is selected such that the average molecular weight of the hydration inhibition agent is from about 190 to about 248. However, regardless of how a particular value of x is selected, the key criteria are that the shale hydration inhibition agent should function as intended in the drilling fluid and should minimize any impact it might have on the other properties of the drilling fluid.

The shale hydration inhibition agent should be present in sufficient concentration to reduce either or both the surface hydration based swelling and/or the osmotic based swelling of the shale. The exact amount of the shale hydration inhibition agent present in a particular drilling fluid formulation can be determined by a trial and error method of testing the combination of drilling fluid and shale formation encountered. Generally however, the shale hydration inhibition agent of the present invention may be used in drilling fluids in a concentration from about 1 to about 18 pounds per barrel (lbs/bbl or ppb) and more preferably in a concentration from about 2 to about 12 pounds per barrel of drilling fluid.

In addition to the inhibition of shale hydration by the shale hydration inhibition agent, other properties are beneficially achieved. In particular it has been found that the shale hydration inhibition agents of the present invention may also be further characterized by their compatibility with other drilling fluid components, tolerant to contaminants, temperature stability and low toxicity. These factors contribute to the concept that the shale hydration inhibition agents of the present invention may have broad application both in land based drilling operations as well as offshore drilling operations.

The drilling fluids of the present invention include a weight material in order to increase the density of the fluid. The primary purpose for such weighting materials is to increase the density of the drilling fluid so as to prevent kick-backs and blow-outs. One of skill in the art should know and understand that the prevention of kick-backs and blow-outs is important to the safe day to day operations of a drilling rig. Thus the weight material is added to the drilling fluid in a functionally effective amount largely dependent on the nature of the formation being drilled.

Weight materials suitable for use in the formulation of the drilling fluids of the present invention may be generally selected from any type of weighting materials be it in solid, particulate form, suspended in solution, dissolved in the aqueous phase as part of the preparation process or added afterward during drilling. It is preferred that the weight material be selected from the group including barite, hematite, iron oxide, calcium carbonate, magnesium carbonate, organic and inorganic salts, and mixtures and combinations of these compounds and similar such weight materials that may be utilized in the formulation of drilling fluids.

The aqueous based continuous phase may generally be any water based fluid phase that is compatible with the formulation of a drilling fluid and is compatible with the shale hydration inhibition agents disclosed herein. In one preferred embodiment, the aqueous based continuous phase is selected from: fresh water, sea water, brine, mixtures of water and water soluble organic compounds and mixtures thereof. The amount of the aqueous based continuous phase should be sufficient to form a water based drilling fluid. This amount may range from nearly 100% of the drilling fluid to less than 30% of the drilling fluid by volume. Preferably, the aqueous based continuous phase is from about 95 to about 30% by volume and preferably from about 90 to about 40% by volume of the drilling fluid.

In addition to the other components previously noted, materials generically referred to as gelling materials, thinners, and fluid loss control agents, are optionally added to water base drilling fluid formulations. Of these additional materials, each can be added to the formulation in a concentration as Theologically and functionally required by drilling conditions. Typical gelling materials used in aqueous based drilling fluids are bentonite, sepiolite clay, attapulgite clay, anionic high-molecular weight polymer and biopolymers.

Thinners such as lignosulfonates are also often added to water-base drilling fluids. Typically lignosulfonates, modified lignosulfonates, polyphosphates and tannins are added. In other embodiments, low molecular weight polyacrylates can also be added as thinners. Thinners are added to a drilling fluid to reduce flow resistance and control gelation tendencies. Other functions performed by thinners include reducing filtration and filter cake thickness, counteracting the effects of salts, minimizing the effects of water on the formations drilled, emulsifying oil in water, and stabilizing mud properties at elevated temperatures.

A variety of fluid loss control agents may be added to the drilling fluids of the present invention that are generally selected from a group consisting of synthetic organic polymers, biopolymers, and mixtures thereof. The fluid loss control agents such as modified lignite, polymers, modified starches and modified celluloses may also be added to the water base drilling fluid system of this invention. In one embodiment it is preferred that the additives of the invention should be selected to have low toxicity and to be compatible with common anionic drilling fluid additives such as polyanionic carboxymethylcellulose (PAC or CMC), polyacrylates, partially-hydrolyzed polyacrylamides (PHPA), lignosulfonates, xanthan gum, mixtures of these and the like.

The drilling fluid of the present invention may further contain an encapsulating agent generally selected from the group consisting of synthetic organic, inorganic and biopolymers and mixtures thereof. The role of the encapsulating agent is to absorb at multiple points along the chain onto the clay particles, thus binding the particles together and encapsulating the cuttings. These encapsulating agents help improve the removal of cuttings with less dispersion of the cuttings into the drilling fluids. The encapsulating agents may be anionic, cationic or non-ionic in nature.

Other additives that could be present in the drilling fluids of the present invention include products such as lubricants, penetration rate enhancers, defoamers, corrosion inhibitors and loss circulation products. Such compounds should be known to one of ordinary skill in the art of formulating aqueous based drilling fluids.

The use of the above disclosed drilling fluids is contemplated as being within the scope of the present invention. Such use would be conventional to the art of drilling subterranean wells and one having skill in the art should appreciate such processes and applications.

EXPERIMENTS OF THE INVENTION

Example 1

This examples illustrates a composition of this invention including 0.5 wt. % of C-100 and 0.5 wt. % of AI-600 in deionized water. C-100 is a corrosion inhibitor available from Clearwater Engineered Chemistry, a Weatherford International, Houston, Tex. and includes a scale control agent comprising a triethanolamine polyphosphoric acid ester, a first corrosion inhibitor comprising an amine salt (morpholine residues) reaction product of boric acid and urea, a mixture ammonium sulfite-bisulfite, a second corrosion inhibitor comprising cocoamidopropyldimethylamine, a tertiary amine of coconut oil and dimethylaminopropyl amine (DMAPA) and isopropanol. AI-600 is a high temperature corrosion inhibitor also available from Clearwater Engineered Chemistry, a Weatherford International, Houston, Tex. and includes a quinoline quaternary surfactant, a blend of acetylenic alcohol replacement solvents and a highly effective dispersant.

The composition was prepared by adding 0.5 wt. % of C-100 to sufficient deionized water with stirring to produce the desired formulation. After the addition of C-100, 0.5 wt. % of AI-600 was added with stirring.

Example 2

This examples illustrates a composition of this invention including 0.5 wt. % of C-119 and 0.5 wt. % of AI-600 in deionized water. C-119 is a corrosion inhibitor available from Clearwater Engineered Chemistry, a Weatherford International, Houston, Tex. and includes a scale control agent comprising a triethanolamine polyphosphoric acid ester, a first corrosion inhibitor comprising an amine salt (morpholine residues) reaction product of boric acid and urea, a mixture ammonium sulfite-bisulfite, a second corrosion inhibitor comprising cocoamidopropyldimethylamine, a tertiary amine of coconut oil, Akzo Armeen DM12D a lauryldimethyl amine and isopropanol.

The composition was prepared by adding 0.5 wt. % of C-119 to sufficient deionized water with stirring to produce the desired formulation. After the addition of C-119, 0.5 wt. % of AI-600 was added with stirring.

Example 3

This examples illustrates a composition of this invention including 0.5 wt. % of C-100, 0.5 wt. % CorrFoam 1 and 0.5 wt. % of AI-600 in deionized water. CorrFoam 1 is an oxygen inhibitor available from Clearwater Engineered Chemistry, a Weatherford International, Houston, Tex. and includes the potassium salt of 100% active polyphosphoric acid ester of ethylene glycol.

The composition was prepared by adding 0.5 wt. % of C-100 to sufficient deionized water with stirring to produce the desired formulation. After the addition of C-100, 0.5 wt. % of CorrFoam 1 was added with stirring. Finally, 0.5 wt. % of AI-600 was added with stirring.

Example 4

This examples illustrates a composition of this invention including 0.5 wt. % of C-119, 0.5 wt. % CorrFoam 1 and 0.5 wt. % of AI-600 in deionized water.

The composition was prepared by adding 0.5 wt. % of C-119 to sufficient deionized water with stirring to produce the desired formulation. After the addition of C-119, 0.5 wt. % of CorrFoam 1 was added with stirring. Finally, 0.5 wt. % of AI-600 was added with stirring.

Example 5

This examples illustrates a composition of this invention including a phosphate ester, a cationic surfactant and a 0.5 wt. % Corrfoam 1 and 0.5 wt. % AI-600 in deionized water.

The composition was prepared by adding 0.5 wt. % of CorrFoam 1 to sufficient deionized water with stirring to produce the desired formulation. After the addition of CorrFoam 1, 0.5 wt. % of AI-600 was added with stirring.

Example 6

After testing of the composition of Example 3, 1.0 wt. % CorrFoam 1, 1.0 wt. % C-100 and 1.0 wt. % of AI-600 were added with stirring.

Example 7

After testing of the composition of Example 4, 1.0 wt. % CorrFoam 1, 1.0 wt. % C-119 and 1.0 wt. % of AI-600 were added with stirring.

Example 8

After testing of the composition of Example 5, 1.0 wt. % CorrFoam 1 and 1.0 wt. % AI-600 were added with stirring.

Example 9

This examples illustrates a composition of this invention including a phosphate ester, a cationic surfactant and a 0.5 wt. % Corrfoam 1, 0.5 wt. % AI-600 and 1.0 wt. % Alpha One in deionized water. Alpha One is a sulfur scavenger available from Clearwater Engineered Chemistry, a Weatherford International, Houston, Tex. and is a reaction product of formaldehyde and a formaldehyde-monoethanolamine condensate.

The composition was prepared by adding 0.5 wt. % of CorrFoam 1 to sufficient deionized water with stirring to produce the desired formulation. After the addition of CorrFoam 1, 0.5 wt. % of AI-600 was added with stirring. Finally, 1.0 wt. % of Alpha One was added with stirring.

Example 10

This examples illustrates a composition of this invention including a phosphate ester, a cationic surfactant and a 0.5 wt. % Corrfoam 1, 0.5 wt. % AI-600 and 1.0 wt. % Sufla Clear® 8849 in deionized water. Sufla Clear® 8849 is an oil soluble sulfur scavenger available from Clearwater Engineered Chemistry, a Weatherford International, Houston, Tex. and is a reaction product between paraformylaldehyde and di-n-butylamine made with a large excess of di-n-butylamine.

The composition was prepared by adding 0.5 wt. % of CorrFoam 1 to sufficient deionized water with stirring to produce the desired formulation. After the addition of CorrFoam 1, 0.5 wt. % of AI-600 was added with stirring. Finally, 1.0 wt. % of Sufla Clear® 8849 was added with stirring.

Example 11

This examples illustrates a composition of this invention including a phosphate ester, a cationic surfactant and a 0.5 wt.

% Corrfoam 1, 0.5 wt. % AI-600 and 1.0 wt. % Sufla Clear® 8199 in deionized water. Sufla Clear® 8199 is an oil soluble sulfur scavenger available from Clearwater Engineered Chemistry, a Weatherford International, Houston, Tex. and is a reaction product between formylaldehyde and dimethylamino propylamine, which forms a triazine.

The composition was prepared by adding 0.5 wt. % of CorrFoam 1 to sufficient deionized water with stirring to produce the desired formulation. After the addition of CorrFoam 1, 0.5 wt. % of AI-600 was added with stirring. Finally, 1.0 wt. % of Sufla Clear® 8199 was added with stirring.

Example 12

This examples illustrates a composition of this invention including a phosphate ester, a cationic surfactant and a 0.5 wt. % Corrfoam 1, 0.5 wt. % AI-600 and 0.5 wt. % A-2802 N in deionized water. A-2802 N is the sodium salt of AMP (aminomethylenetriphosphonic acid).

The composition was prepared by adding 0.5 wt. % of CorrFoam 1 to sufficient deionized water with stirring to produce the desired formulation. After the addition of CorrFoam 1, 0.5 wt. % of AI-600 was added with stirring. Finally, 0.5 wt. % of A-2802 was added with stirring.

Example 13

This examples illustrates a composition of this invention including 1.0 wt. % CorrFoam 1, 1.0 wt. % of C-100 and 1.0 wt. % of AI-600 in deionized water.

The composition was prepared by adding 1.0 wt. % of C-100 to sufficient deionized water with stirring to produce the desired formulation. After the addition of C-100, 1.0 wt. % of CorrFoam 1 was added with stirring. Finally 1.0 wt. % of AI-600 was added with stirring.

Example 14

This examples illustrates a composition of this invention including 1.0 wt. % CorrFoam 1, 1.0 wt. % of C-119 and 1.0 wt. % of AI-600 in deionized water.

The composition was prepared by adding 1.0 wt. % of C-119 to sufficient deionized water with stirring to produce the desired formulation. After the addition of C-119, 1.0 wt. % of CorrFoam 1 was added with stirring. Finally 1.0 wt. % of AI-600 was added with stirring.

Example 15

This examples illustrates a composition of this invention including 1.0 wt. % CorrFoam 1 and 1.0 wt. % of AI-600 in deionized water.

The composition was prepared by adding 0.5 wt. % of CorrFoam 1 to sufficient deionized water with stirring to produce the desired formulation, followed by the addition of 1.0 wt. % of AI-600 with stirring.

Example 16

This examples illustrates a composition of this invention including a phosphate ester, a cationic surfactant and a 1.0 wt. % Corrfoam 1, 1.0 wt. % AI-600 and 2.0 wt. % Alpha One in deionized water.

The composition was prepared by adding 1.0 wt. % of CorrFoam 1 to sufficient deionized water with stirring to produce the desired formulation. After the addition of CorrFoam 1, 1.0 wt. % of AI-600 was added with stirring. Finally, 2.0 wt. % of Alpha One was added with stirring.

Example 17

This examples illustrates a composition of this invention including a phosphate ester, a cationic surfactant and a 1.0 wt. % Corrfoam 1, 1.0 wt. % AI-600 and 2.0 wt. % 8849 in deionized water.

The composition was prepared by adding 1.0 wt. % of CorrFoam 1 to sufficient deionized water with stirring to produce the desired formulation. After the addition of CorrFoam 1, 1.0 wt. % of AI-600 was added with stirring. Finally, 2.0 wt. % of 8849 was added with stirring.

Corrosion Testing

Tests 1-6

Figure 1C:
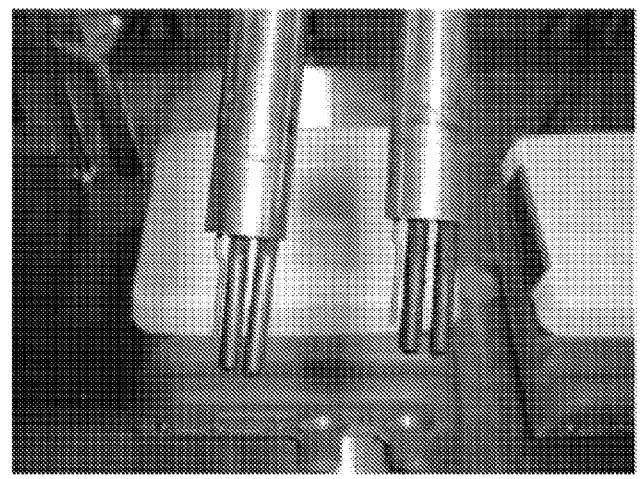
Figure 1D:
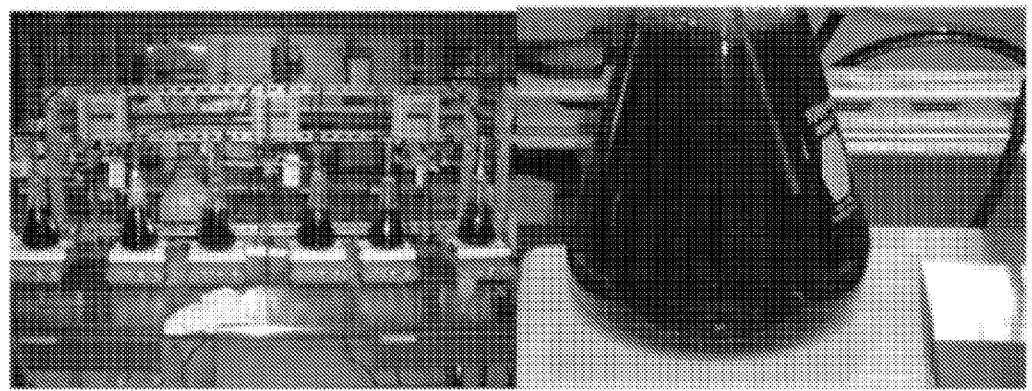

The pH values of the solutions were originally about pH 8, but were adjust to about pH 10 by the addition of a sodium hydroxide solution. The above test solutions were placed in a testing vessel and a electrodes were placed in the solutions and maintained with stirring at a temperature of about 120° F. The results of these tests are tabulated in Table IA and shown graphically in FIGS. 1A&B. Looking at FIG. 1C, an electrode is shown that is exposed to a non-corrosive environment and one exposed to a corrosive environment. Looking at FIG. 1D, photos of the solutions are shown after the addition of sodium sulfide and $CO_2$, which produces $H_2S$ in situ.

TABLE IA

| | Example 1 Test 1 | | Example 2 Test 2 | | Example 3 Test 3 | | Example 4 Test 4 | | Example 5 Test 5 | | Blank Test 6 | | |
|---|---|---|---|---|---|---|---|---|---|---|---|---|---|
| Time | Rate | Imbalance | Rate | Imbalance | Rate | Imbalance | Rate | Imbalance | Rate | Imbalance | Rate | Imbalance | Comments |
| 0:00:00 | 0 | 0 | 0 | 0 | 0 | 0 | 0 | 0 | 0 | 0 | 0 | 0 | |
| 0:30:00 | 9.63 | 5.52 | 8.27 | 16.31 | 8.14 | 10.19 | 7.23 | 12.89 | 8.98 | 16.6 | 62.22 | 73.41 | |
| 1:00:00 | 8.8 | 3.15 | 7.66 | 3.54 | 10.8 | 0.95 | 9.84 | 5.61 | 11.36 | 8.05 | 60.69 | 44.49 | |
| 1:30:00 | 7.61 | 2.71 | 6.3 | 3.86 | 8.95 | 0.31 | 7.57 | 5.4 | 12.83 | 9.52 | 57.81 | 23.81 | |
| 2:00:00 | 7.26 | 2.54 | 10.08 | 6.32 | 17.58 | 0.06 | 6.59 | 5.77 | 13.63 | 9.74 | 55.21 | 2.33 | |
| 2:30:00 | 34.53 | 0.07 | 29.82 | 10.75 | 18.6 | 1.56 | 17.3 | 17.35 | 14.25 | 9.53 | 52.2 | 19.13 | |
| 3:00:00 | 41.52 | 34.66 | 33.7 | 24.36 | 48.87 | 0.07 | 15 | 16.78 | 14.42 | 9.24 | 51.61 | 20.16 | |
| 3:30:00 | 38.98 | 41.28 | 18.49 | 58.04 | 44.41 | 4.93 | 28.03 | 9.64 | 13.99 | 7.67 | 51.72 | 13.26 | |
| 4:00:00 | 37.46 | 23.68 | 30.71 | 76.28 | 35.93 | 6.87 | 25.51 | 9.31 | 13.54 | 7.03 | 44.94 | 40.02 | |
| 4:30:00 | 36.56 | 22.41 | 30.38 | 64.27 | 33.62 | 4.92 | 23.82 | 21.38 | 12.46 | 6.03 | 43.16 | 55.54 | |
| 5:00:00 | 37.02 | 14.4 | 30.77 | 62.22 | 30.1 | 4.45 | 23.32 | 24.3 | 11.45 | 5.05 | 40.16 | 71.4 | |
| 5:30:00 | 37.31 | 9.98 | 30.61 | 55.91 | 29.85 | 4.49 | 20.78 | 26.38 | 10.79 | 4.27 | 37.6 | 67.04 | |
| 6:00:00 | 39.91 | 8.66 | 31.03 | 50.92 | 24.98 | 3.58 | 20.87 | 24.84 | 10.05 | 3.91 | 35.19 | 56.05 | |
| 6:30:00 | 38.85 | 1.87 | 31.42 | 43.57 | 27.16 | 1.93 | 19.14 | 23.82 | 9.53 | 3.22 | 31.95 | 41.06 | |

TABLE IA-continued

Corrosion Test

| Time | Example 1 Test 1 Rate | Example 1 Test 1 Imbalance | Example 2 Test 2 Rate | Example 2 Test 2 Imbalance | Example 3 Test 3 Rate | Example 3 Test 3 Imbalance | Example 4 Test 4 Rate | Example 4 Test 4 Imbalance | Example 5 Test 5 Rate | Example 5 Test 5 Imbalance | Blank Test 6 Rate | Blank Test 6 Imbalance | Comments |
|---|---|---|---|---|---|---|---|---|---|---|---|---|---|
| 7:00:00 | 39.99 | 0.39 | 31.54 | 38.15 | 24.5 | 0.38 | 18.61 | 23.65 | 9.23 | 2.55 | 30.7 | 35.09 | |
| 7:30:00 | 39.87 | 0.32 | 30.55 | 32.2 | 23.87 | 0.91 | 17.68 | 23 | 8.74 | 2.19 | 28.29 | 27.57 | |
| 8:00:00 | 40.71 | 1.17 | 29.89 | 30.26 | 24.23 | 0.37 | 17.12 | 21.49 | 8.44 | 2.14 | 26.69 | 23.74 | |
| 8:30:00 | 40.36 | 3.09 | 30.64 | 27.55 | 21.47 | 0.14 | 16.46 | 21.32 | 8.11 | 1.64 | 25.54 | 21.06 | |
| 9:00:00 | 40.85 | 6.82 | 29.01 | 21.18 | 18.42 | 0.19 | 15.75 | 21.38 | 7.66 | 1.57 | 24.11 | 19.34 | |
| 9:30:00 | 40.39 | 8.73 | 27.15 | 21.85 | 16.92 | 0.2 | 14.91 | 21.31 | 7.41 | 1.61 | 23.49 | 18.22 | |
| 10:00:00 | 39.48 | 9.11 | 27 | 15.83 | 17.24 | 0.05 | 14.59 | 21.18 | 7 | 1.24 | 23.5 | 15.87 | |
| 10:30:00 | 39.35 | 11.73 | 28.03 | 19.44 | 15.55 | 0.35 | 14.12 | 21.03 | 6.85 | 1.15 | 23.01 | 15.6 | |
| 11:00:00 | 39.38 | 13.25 | 27.9 | 15.06 | 16.47 | 0.45 | 13.83 | 21.12 | 6.64 | 1.38 | 22.52 | 13.77 | |
| 11:30:00 | 39.13 | 12.53 | 26.04 | 15.83 | 14.4 | 0.15 | 13.02 | 22.19 | 6.39 | 1.16 | 21.46 | 12.37 | |
| 12:00:00 | 38.88 | 14.35 | 26.69 | 14.01 | 13.47 | 0.84 | 13.06 | 21.48 | 6.03 | 0.94 | 20.96 | 10.34 | |
| 12:30:00 | 38.26 | 14.93 | 27.01 | 15.13 | 13.58 | 1.13 | 12.8 | 21.54 | 6.02 | 0.98 | 21.01 | 8.08 | |
| 13:00:00 | 38.06 | 14.69 | 27.33 | 12.47 | 12.29 | 1.31 | 12.59 | 22 | 5.85 | 0.81 | 20.95 | 4.87 | |
| 13:30:00 | 38.94 | 13.78 | 25.39 | 12.09 | 11.48 | 1.49 | 12.33 | 21.12 | 5.73 | 0.83 | 18.8 | 2.55 | |
| 14:00:00 | 36.89 | 12.37 | 24.87 | 8.87 | 11.06 | 1.72 | 12.24 | 21.6 | 5.36 | 0.99 | 19.19 | 0.14 | |
| 14:30:00 | 38.34 | 11.17 | 26.14 | 9.58 | 10.46 | 1.97 | 12.12 | 21.72 | 5.42 | 0.71 | 19.97 | 1.67 | |
| 15:00:00 | 37.46 | 12 | 28.47 | 7.21 | 10.39 | 2.11 | 12.09 | 21.32 | 5.44 | 0.8 | 18.5 | 2.97 | |
| 15:30:00 | 38.21 | 13.19 | 26.98 | 7.83 | 10.17 | 2.12 | 12.26 | 22.04 | 5.22 | 0.64 | 18.26 | 4.4 | |
| 16:00:00 | 38.82 | 12.94 | 27.98 | 6.09 | 10 | 2.24 | 12.12 | 22.11 | 5.36 | 0.68 | 18.11 | 5.44 | |
| 16:30:00 | 39.47 | 12.74 | 28.22 | 5.98 | 9.66 | 2.58 | 12.21 | 21.84 | 5.09 | 0.71 | 17.4 | 5.64 | |
| 17:00:00 | 38.4 | 13.16 | 27.62 | 4.5 | 9.39 | 2.44 | 12.12 | 21.78 | 5.14 | 0.65 | 17.3 | 5.36 | Heat to 120° F., Add CO$_2$ |
| 17:30:00 | 42.85 | 14.98 | 28.74 | 5.63 | 12.4 | 2.66 | 12.13 | 21.48 | 7.75 | 0.74 | 19.59 | 5.04 | |
| 18:00:00 | 107.41 | 3.35 | 74.17 | 8.04 | 22.32 | 7.64 | 43.65 | 71.34 | 11.3 | 0.51 | 32.22 | 8.64 | |
| 18:30:00 | 98.74 | 25.18 | 101.77 | 16.42 | 21.04 | 9.86 | 41.57 | 54.89 | 11.3 | 0.51 | 38.27 | 24.98 | |
| 19:00:00 | 91.49 | 21.95 | 90.24 | 41.29 | 19.38 | 12.08 | 36.15 | 28.82 | 11.3 | 0.51 | 38.27 | 24.98 | |
| 19:30:00 | 82.25 | 26.24 | 86.78 | 46.78 | 17.97 | 13.16 | 34.42 | 18.45 | 2.48 | 3.72 | 24.87 | 34.05 | |
| 20:00:00 | 100.16 | 32.93 | 86.71 | 57.51 | 17.28 | 13.88 | 30.77 | 11.01 | 2.48 | 3.72 | 24.87 | 34.05 | |
| 20:30:00 | 79.34 | 58.45 | 65.01 | 77.91 | 16.51 | 5.03 | 29.95 | 10.71 | 16.15 | 5.2 | 41.16 | 41.97 | |
| 21:00:00 | 66.73 | 15.29 | 49 | 18.88 | 16.68 | 1.46 | 26.94 | 20.29 | 20.93 | 8.38 | 45.51 | 7.08 | |
| 21:30:00 | 55.08 | 13.47 | 40.82 | 14.47 | 23.71 | 2.65 | 23.76 | 13.43 | 15.3 | 6.96 | 68.32 | 30.08 | |
| 22:00:00 | 46.97 | 13.82 | 40.23 | 10.47 | 29.01 | 2.56 | 23.25 | 0.84 | 17.36 | 8.46 | 94.97 | 34.58 | |
| 22:30:00 | 43.5 | 14.96 | 47.32 | 4.6 | 58.97 | 3.23 | 28.8 | 0.79 | 21.31 | 8.34 | 107.32 | 31.11 | |
| 23:00:00 | 51.7 | 13.63 | 49.03 | 2.43 | 61.76 | 1.77 | 31.55 | 5.78 | 26.56 | 8.6 | 118.04 | 25.9 | |
| 23:30:00 | 50.58 | 10.57 | 49.03 | 2.33 | 58.96 | 0.71 | 32.24 | 8.7 | 32.13 | 6.8 | 124.5 | 18.37 | |
| 24:00:00 | 41.8 | 10.76 | 48.27 | 1.79 | 55.31 | 0.12 | 32.87 | 14.09 | 34.47 | 5.82 | 124.24 | 9.21 | |
| 24:30:00 | 37.78 | 9.26 | 46.27 | 1.36 | 55.5 | 0.58 | 33.65 | 16.94 | 37.96 | 4.1 | 124.54 | 4.66 | |
| 25:00:00 | 36.55 | 7.76 | 43.61 | 3.04 | 63.88 | 6.48 | 34.34 | 19.19 | 41.71 | 3.51 | 123.9 | 1.42 | |
| 25:30:00 | 25.52 | 6.63 | 39.05 | 1.44 | 58.78 | 10.39 | 32.21 | 19.25 | 44.22 | 2.92 | 121.73 | 2.14 | Hold @ 120° F., CO$_2$ off |
| 26:00:00 | 23.05 | 5.8 | 35.31 | 2.41 | 56.3 | 11.43 | 31.52 | 20.48 | 45.36 | 2.1 | 118.18 | 12.22 | |
| 26:30:00 | 42.71 | 6.3 | 42.74 | 0.09 | 46.59 | 76.52 | 34.2 | 29.19 | 44.98 | 1.12 | 108.23 | 40.24 | |
| 27:00:00 | 62.57 | 10.27 | 51.21 | 7.1 | 46.37 | 84.36 | 32.99 | 41.98 | 40.03 | 6.17 | 100.88 | 54.82 | |
| 27:30:00 | 67.37 | 18.07 | 59.33 | 9.93 | 50.8 | 71.92 | 30.37 | 38.75 | 40.63 | 10.11 | 94.13 | 69.4 | |
| 28:00:00 | 65.29 | 35.54 | 66.3 | 5.68 | 53.85 | 88.15 | 35.25 | 33.9 | 34.26 | 42.33 | 87.78 | 76.35 | |
| 28:30:00 | 74.22 | 43.64 | 60.45 | 1.16 | 49.32 | 100.23 | 31.44 | 33.15 | 32.37 | 33.35 | 82.47 | 74.32 | |
| 29:00:00 | 82.69 | 49.28 | 66.58 | 9.17 | 54.53 | 94.26 | 36.19 | 26.42 | 25.11 | 35.14 | 79.44 | 77.87 | |
| 29:30:00 | 91.15 | 61.25 | 70.28 | 25.15 | 54.15 | 95.12 | 35.65 | 23.39 | 22.58 | 35.51 | 72.49 | 82.56 | |
| 30:00:00 | 89.11 | 63.4 | 74.02 | 31.02 | 48.73 | 84.34 | 34.13 | 24.51 | 18.07 | 27.73 | 68.76 | 81.17 | |
| 30:30:00 | 99.37 | 75.16 | 77.69 | 47.7 | 47.88 | 80.31 | 35.71 | 26.04 | 17.16 | 21.33 | 64.96 | 77.73 | |
| 31:00:00 | 122.29 | 82.52 | 83.52 | 58.86 | 45.1 | 71.66 | 35.33 | 27.83 | 15.89 | 19.48 | 62.94 | 71.32 | |
| 31:30:00 | 126.01 | 98.69 | 82.5 | 126.87 | 42.92 | 73.75 | 35.8 | 31.88 | 13.93 | 17.22 | 60.84 | 62.52 | |
| 32:00:00 | 118.45 | 118.7 | 84.34 | 136.67 | 41.98 | 65.81 | 35.3 | 34.93 | 13.01 | 12.11 | 58.55 | 58.52 | |
| 32:30:00 | 120.13 | 119.5 | 85.89 | 150.68 | 38.3 | 61.55 | 37.88 | 36.88 | 12.18 | 7.27 | 57.19 | 37.1 | |
| 33:00:00 | 131.8 | 115.81 | 86.74 | 152.84 | 36.66 | 60.39 | 36.78 | 39.18 | 9.43 | 5.76 | 55.85 | 25.07 | |
| 33:30:00 | 141.95 | 98.34 | 86.18 | 163.57 | 35.16 | 55.6 | 35.54 | 41.12 | 8.62 | 4.39 | 57.1 | 11.48 | |
| 34:00:00 | 143.33 | 41.38 | 87.55 | 172.45 | 32.55 | 54.09 | 35.86 | 46.82 | 7.8 | 3.7 | 57.06 | 5.08 | |
| 34:30:00 | 126.77 | 20.8 | 88.24 | 182.87 | 32.36 | 50.19 | 38.54 | 43.81 | 7.18 | 3.36 | 60.44 | 2.27 | |
| 35:00:00 | 116.69 | 9.82 | 89.44 | 208.42 | 31.36 | 49.64 | 36.27 | 43.46 | 6.78 | 3.08 | 60.44 | 2.27 | |
| 35:30:00 | 118.74 | 37.01 | 91.45 | 218.25 | 29.25 | 44.27 | 34.01 | 46.17 | 6.47 | 3.07 | 66.51 | 4.73 | |
| 36:00:00 | 122.68 | 38.77 | 91.02 | 226.85 | 29.79 | 40.28 | 36.74 | 48.64 | 6.22 | 3.13 | 80.31 | 16.6 | |
| 36:30:00 | 150.08 | 26.98 | 91.58 | 226.7 | 29.01 | 42.67 | 34.64 | 44.53 | 6.22 | 3.13 | 90.51 | 32.96 | |
| 37:00:00 | 121.92 | 17.78 | 91.34 | 225.47 | 26.26 | 36.79 | 38.6 | 45.69 | 5.96 | 3.13 | 96.16 | 50.34 | |
| 37:30:00 | 120.88 | 9.72 | 90.39 | 225.86 | 26.92 | 39.52 | 37.62 | 41.49 | 5.72 | 3.1 | 94.89 | 44.57 | |
| 38:00:00 | 116.75 | 8.35 | 90.46 | 229.35 | 26.64 | 37.24 | 35.25 | 43.45 | 5.6 | 3.12 | 94.89 | 44.57 | |
| 38:30:00 | 113.82 | 20.99 | 90.02 | 232 | 24.39 | 32.55 | 34 | 41.91 | 5.6 | 3.12 | 93.16 | 28.82 | |
| 39:00:00 | 126.2 | 30.59 | 89.35 | 237 | 25.83 | 34.92 | 36.81 | 43.11 | 5.5 | 3.19 | 93.93 | 19.99 | |
| 39:30:00 | 131.4 | 49.19 | 89.74 | 239.61 | 25.69 | 35.93 | 36.21 | 41.42 | 5.45 | 3.35 | 92.21 | 15.19 | |
| 40:00:00 | 117.12 | 63.71 | 88.31 | 238.95 | 26.64 | 30.29 | 33.19 | 41.59 | 5.4 | 3.26 | 91.01 | 13.25 | |
| 40:30:00 | 132.88 | 69.95 | 87.8 | 237.8 | 25.38 | 30.16 | 36.54 | 40.36 | 5.37 | 3.48 | 89.62 | 12.43 | |
| 41:00:00 | 110.29 | 79.59 | 87.18 | 231.26 | 24.6 | 33.08 | 35.93 | 42.02 | 5.25 | 3.47 | 87.69 | 12.52 | |

TABLE IA-continued

| | Corrosion Test | | | | | | | | | | | |
|---|---|---|---|---|---|---|---|---|---|---|---|---|
| | Example 1 Test 1 | | Example 2 Test 2 | | Example 3 Test 3 | | Example 4 Test 4 | | Example 5 Test 5 | | Blank Test 6 | |
| Time | Rate | Imbalance | Rate | Imbalance | Rate | Imbalance | Rate | Imbalance | Rate | Imbalance | Rate | Imbalance | Comments |
| 41:30:00 | 136.24 | 79.82 | 85.56 | 227.36 | 21.68 | 33.66 | 37.37 | 39.45 | 9.01 | 3.49 | 84.41 | 13.87 | Added 0.5% AI-600 |
| 42:00:00 | 133.84 | 87.41 | 86.37 | 209.85 | 21.83 | 21.37 | 40.47 | 45.4 | 4.53 | 2.58 | 84.41 | 13.87 | |
| 42:30:00 | 107.9 | 89.74 | 87.61 | 201.83 | 18.05 | 21.29 | 37.44 | 43.8 | 4.53 | 2.58 | 81.79 | 14.78 | |
| 43:00:00 | 96.69 | 83.82 | 86.94 | 196 | 18.68 | 16.83 | 35.11 | 45.12 | 3.98 | 2.16 | 76.31 | 13.19 | Add $CO_2$ |
| 43:30:00 | 97.89 | 65.66 | 86.95 | 188.81 | 17.76 | 20.66 | 36.09 | 45.38 | 3.4 | 1.9 | 77.16 | 9.61 | |
| 44:00:00 | 107.31 | 68.94 | 94.23 | 176.17 | 24.68 | 22.54 | 31.63 | 42.53 | 7.41 | 1.33 | 110.71 | 16.97 | |
| 44:30:00 | 63.34 | 106.97 | 67.97 | 17.44 | 22.61 | 13.1 | 28.18 | 34.27 | 10.89 | 2.52 | 96.23 | 50.54 | |
| 45:00:00 | 41.94 | 14.94 | 44.14 | 7.55 | 20.12 | 9.96 | 23.65 | 30.22 | 14.06 | 2.06 | 98.31 | 43.9 | Added 1 g Calcium Oxide |
| 45:30:00 | 14.5 | 8.16 | 29.11 | 8.49 | 34.48 | 9.11 | 21.51 | 30.78 | 27.96 | 1.1 | 74 | 14.61 | |
| 46:00:00 | 15.75 | 2.38 | 33.08 | 13.31 | 21.39 | 9.05 | 22.83 | 22.58 | 11.51 | 0.36 | 52.5 | 23.78 | Added $CO_2$ |
| 46:30:00 | 9.59 | 3.78 | 14.81 | 6.46 | 12.21 | 1.19 | 22.12 | 21.57 | 8.72 | 0.88 | 72.12 | 14.17 | Added 1 g Sodium Sulfide |
| 47:00:00 | 7.95 | 2.29 | 9.15 | 2.51 | 11.57 | 0.49 | 16.77 | 24.98 | 8.16 | 1.1 | 81.4 | 9.61 | |
| 47:30:00 | 161.18 | 35.75 | 125.79 | 30.26 | 291.51 | 1.61 | 16.77 | 24.98 | 8.16 | 1.1 | 187.96 | 117.94 | |
| 48:00:00 | 31.9 | 34.73 | 83.82 | 93.62 | 45.46 | 18.2 | 31.71 | 26.39 | 20.5 | 3.96 | 187.96 | 117.94 | |

The solutions of Examples 6-8 were placed in a stainless steel bomb along with coupons 3-5 from the above test. The bombs were place in an oven on a roller mill and the temperature was adjusted to 450° F. The bombs were rolled under their own pressure for one day and the coupons analyzed pre-acid clean up and post acid clean up. The results are tabulated in Table IIA&B.

TABLE IIA

Pre Acid Clean Up 450° F.

| Test # | Coupon # | Test Solution | Initial Weight | Final Weight | Time (Days) | Density (g/cm$^3$) | SA (in$^2$) | Corrosion (mpy) | Corrosion (lb/ft$^2$/yr) | Comments |
|---|---|---|---|---|---|---|---|---|---|---|
| 3 | 3 | Example 6 | 22.4590 | 22.4288 | 1 | 7.87 | 3.467 | 24.7 | 1.00 | |
| 4 | 4 | Example 7 | 22.1563 | 22.1540 | 1 | 7.87 | 3.467 | 1.9 | 0.08 | |
| 5 | 5 | Example 8 | 22.7284 | 22.7016 | 1 | 7.87 | 3.467 | 21.9 | 0.89 | | mpy = (weight loss in grams) * (22,300)/(Adt)

TABLE IIB

Post Acid Clean Up 450° F.

| Test # | Coupon # | Test Solution | Initial Weight | Final Weight | Time (Days) | Density (g/cm$^3$) | SA (in$^2$) | Corrosion (mpy) | Corrosion (lb/ft$^2$/yr) | Comments |
|---|---|---|---|---|---|---|---|---|---|---|
| 3 | 3 | Example 6 | 22.4590 | 22.3918 | 1 | 7.87 | 3.467 | 54.9 | 2.23 | No Pitting |
| 4 | 4 | Example 7 | 22.1563 | 22.1034 | 1 | 7.87 | 3.467 | 43.2 | 1.76 | No Pitting |
| 5 | 5 | Example 8 | 22.7284 | 22.5719 | 1 | 7.87 | 3.467 | 127.9 | 5.20 | Small amt. of pitting | mpy = (weight loss in grams) * (22,300)/(Adt)

The physical and chemical properties of the coupons that were used in the above tests and in all subsequent tests are tabulated in Table IIC.

TABLE IIC

Coupon Properties

Physical Properties

| Tensile | 73,670 PSI |
|---|---|
| Yield | 60,00 PSI |
| Elongation | 41.50% |

Coupon Metallurgy

| Al | 0.027 | Cu | 0.015 | Ni | 0.007 |
|---|---|---|---|---|---|
| C | 0.196 | Fe | Balance | P | 0.011 |
| Ca | 0.003 | Mn | 0.609 | S | 0.003 |
| Cr | 0.034 | Mo | 0.012 | Si | 0.091 |
| | | | | V | 0.002 |

Looking at FIGS. 2A-F, the coupons from Tests 3-5 are shown both pre-acid wash, FIGS. 2A, C and E, and post acid wash, FIGS. 2B, D and F.

Test 7-12

The pH values of the solutions were originally about pH 8, but were adjust to about pH 10 by the addition of a sodium hydroxide solution. The above test solutions were placed in a testing vessel and a electrodes were placed in the solutions and maintained with stirring at a temperature of about 120° F.

Figure 3A:
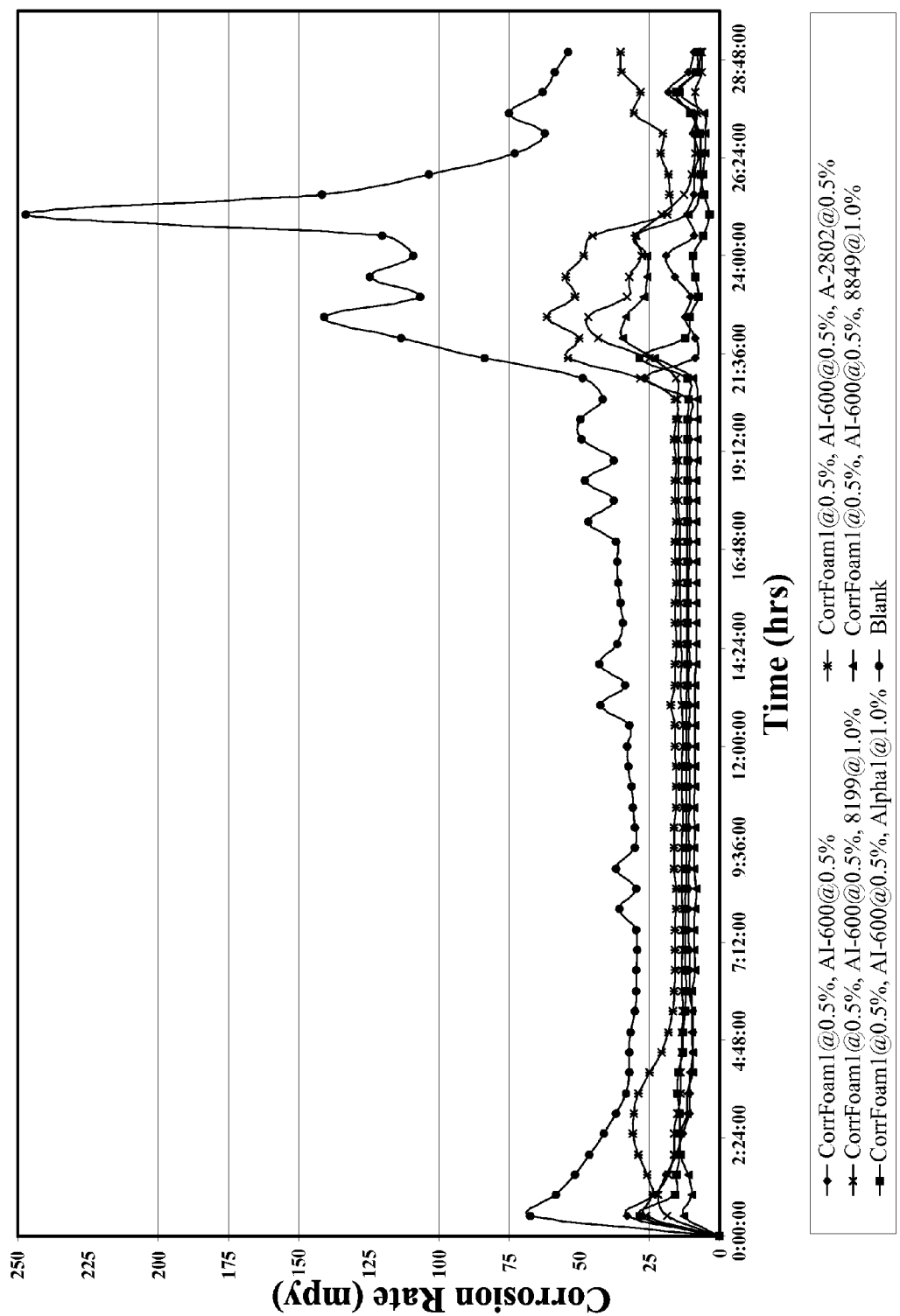
FIGS. 3A&B depict plots of corrosion rate and imbalance for several compositions of this invention in 3.5% Seawater, respectively.
Figure 3B:
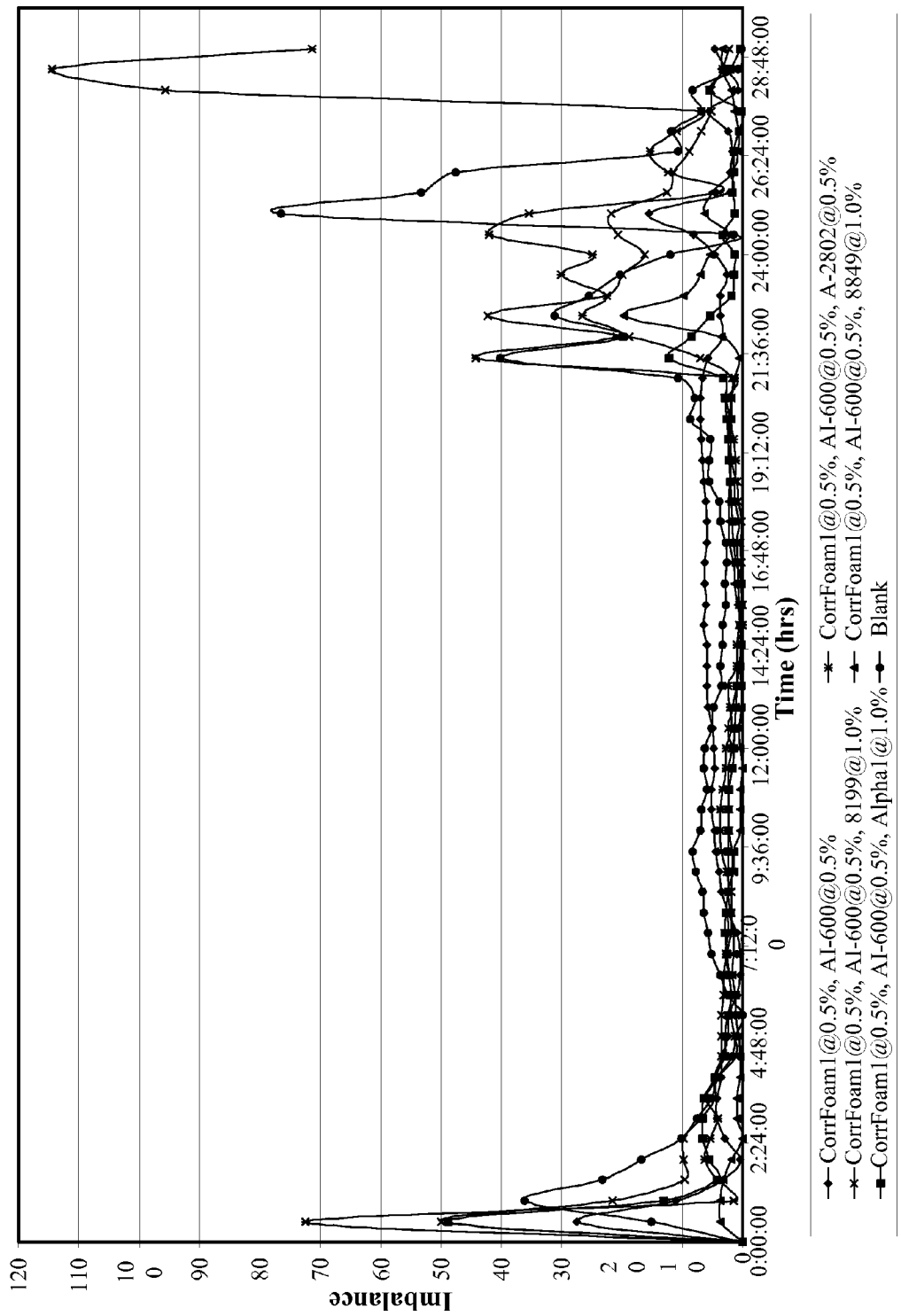
FIG. 3C depicts a photograph of the solutions of in Tests 7-12.
FIG. 3D depicts a photograph of the electrodes that were placed in the solution of Test 7 and Test 8.
FIG. 3E depicts a photograph of the electrodes that were placed in the solution of Test 9 and Test 10.
FIG. 3F depicts a photograph of the electrodes that were placed in the solution of Test 11 and Test 12.
Figure 3C:
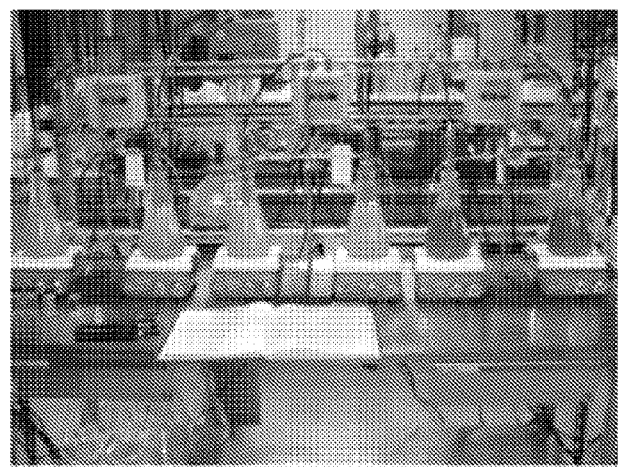
Figure 3D:
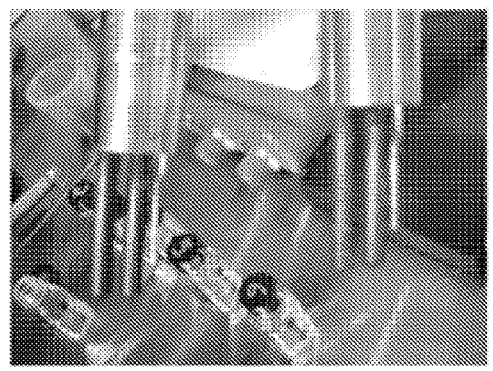
Figure 3E:
Figure 3F:
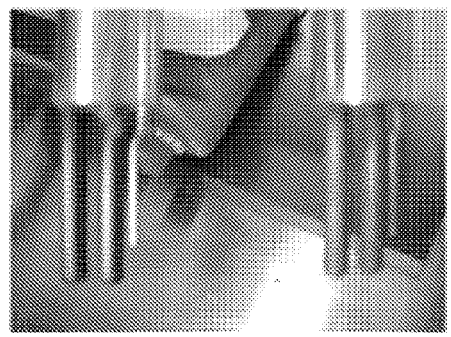

The results of these tests are tabulated in Table IIIA and shown graphically in FIGS. 3A&B. Looking at FIG. 3C, the solutions used in Tests 7-12 are shown. Looking at FIG. 3D, the electrodes that were placed in the solution of Test 7 and Test 8 are shown. Looking at FIG. 3E, the electrodes that were placed in the solution of Test 9 and Test 10 are shown. Looking at FIG. 3F, the electrodes that were placed in the solution of Test 11 and Test 12 are shown.

TABLE IIIA

Corrosion Test

| | Example 5 Test 7 | | Example 9 Test 8 | | Example 10 Test 9 | | Example 11 Test 10 | | Example 12 Test 11 | | Blank Test 12 | | | |
|---|---|---|---|---|---|---|---|---|---|---|---|---|---|---|
| Time | Rate | Imbalance | Rate | Imbalance | Rate | Imbalance | Rate | Imbalance | Rate | Imbalance | Rate | Imbalance | pH | Comments |
| 11:15 | 0 | 0 | 0 | 0 | 0 | 0 | 0 | 0 | 0 | 0 | 0 | 0 | | Heat to 120° F. |
| 11:45 | 33 | 27.55 | 28.4 | 48.81 | 12.67 | 3.63 | 18.74 | 49.87 | 26.03 | 72.42 | 67.61 | 15.05 | | |
| 12:15 | 23.21 | 11.15 | 15.86 | 13.1 | 10.02 | 3.77 | 22 | 21.63 | 23.96 | 1.41 | 58.23 | 36.12 | | |
| 12:45 | 18.98 | 3.17 | 15.41 | 4.19 | 11.28 | 3.17 | 18.28 | 9.58 | 25.89 | 4.18 | 51.5 | 23.29 | | |
| 1:15 | 15.31 | 0.37 | 14.19 | 5.56 | 14.03 | 1.83 | 16.37 | 9.68 | 28.84 | 6.31 | 46.37 | 16.76 | | |
| 1:45 | 13.16 | 3.04 | 14.13 | 6.56 | 13.72 | 0.03 | 16.37 | 9.68 | 30.93 | 5.33 | 41.41 | 10.11 | | |
| 2:15 | 10.78 | 4.2 | 14.13 | 6.56 | 11.64 | 0.97 | 14.95 | 6.8 | 30.4 | 4.07 | 36.94 | 7.61 | | |
| 2:45 | 10.78 | 4.2 | 15.26 | 6.51 | 11.64 | 0.97 | 14 | 4.7 | 28.8 | 6.13 | 33.26 | 5.17 | | |
| 3:15 | 10.18 | 3.58 | 14.6 | 4.54 | 9.43 | 0.29 | 14 | 4.7 | 24.84 | 4.13 | 32.19 | 4.11 | | |
| 3:45 | 9.39 | 3.26 | 13.1 | 3.03 | 9.43 | 0.29 | 13.55 | 3.59 | 20.49 | 1.15 | 32.24 | 1.62 | | |
| 4:15 | 9.66 | 2.48 | 13.1 | 3.03 | 10.05 | 0.58 | 13.55 | 3.59 | 18.45 | 1.3 | 31.76 | 1.05 | | |
| 4:45 | 9.66 | 2.48 | 12.38 | 2.34 | 9.81 | 1.07 | 13.17 | 3.57 | 16.57 | 1.8 | 30.35 | 0.05 | | |
| 5:15 | 10.77 | 0.88 | 12.05 | 1.89 | 9.81 | 1.07 | 13.64 | 3.16 | 16.36 | 2.01 | 29.57 | 2.44 | | |
| 5:45 | 10.74 | 0.45 | 12.12 | 2.22 | 8.63 | 1.74 | 13.64 | 3.16 | 16 | 2.18 | 29.93 | 3.69 | | |
| 6:15 | 10.85 | 0.34 | 12.14 | 2.58 | 9.21 | 1.47 | 13.04 | 2.51 | 15.79 | 2.78 | 29.46 | 5.16 | | |
| 6:45 | 11.05 | 0.99 | 12.15 | 2.94 | 9.21 | 1.47 | 12.99 | 1.88 | 15.88 | 2.48 | 29.59 | 5.75 | | |
| 7:15 | 11.11 | 2.38 | 12.16 | 2.68 | 8.72 | 2.05 | 12.99 | 1.88 | 15.62 | 2.63 | 35.9 | 6.41 | | |
| 7:45 | 10.96 | 3.51 | 12.06 | 2.42 | 8.37 | 2.47 | 13.33 | 1.92 | 15.62 | 2.46 | 29.9 | 6.61 | | |
| 8:15 | 11.16 | 3.82 | 12.09 | 2.36 | 9.02 | 1.52 | 13.42 | 1.64 | 16.34 | 2.51 | 36.82 | 7.69 | | |
| 8:45 | 10.9 | 4.35 | 12.03 | 2.35 | 9.02 | 1.52 | 13.3 | 1.62 | 16.3 | 3.51 | 30.3 | 8.21 | | |
| 9:15 | 10.92 | 4.54 | 11.87 | 2.38 | 8.57 | 0.34 | 13.09 | 2.24 | 16.22 | 3.67 | 30.24 | 6.94 | | |
| 9:45 | 10.83 | 5.07 | 11.87 | 2.32 | 8.94 | 0.45 | 13.25 | 2.21 | 15.66 | 3.72 | 31.13 | 6.91 | | |
| 10:15 | 10.78 | 5.11 | 11.79 | 2.13 | 8.87 | 0.45 | 13.33 | 2.33 | 15.5 | 3.31 | 31.45 | 5.99 | | |
| 10:45 | 10.9 | 4.69 | 11.76 | 1.61 | 8.59 | 0.01 | 13.33 | 2.33 | 15.6 | 2.83 | 32.38 | 6.5 | | |
| 11:15 | 11.01 | 4.82 | 11.74 | 1.47 | 8.59 | 0.3 | 13.1 | 1.77 | 16.02 | 2.68 | 32.94 | 6.23 | | |
| 11:45 | 10.97 | 5.02 | 11.73 | 1.34 | 8.63 | 0.51 | 13.24 | 2.38 | 15.95 | 1.85 | 32.26 | 5.14 | | |
| 12:15 | 10.87 | 5.69 | 11.71 | 1.16 | 8.74 | 0.17 | 13.6 | 1.58 | 17.41 | 2.09 | 42.3 | 4.76 | | |
| 12:45 | 10.95 | 5.81 | 11.68 | 0.98 | 8.62 | 0.11 | 13.83 | 0.83 | 15.7 | 2.33 | 33.89 | 3.59 | | |
| 1:15 | 10.83 | 5.93 | 11.69 | 0.51 | 8.5 | 0.37 | 13.69 | 0.88 | 16.03 | 0.97 | 42.97 | 3.65 | | |
| 1:45 | 10.96 | 5.97 | 11.68 | 0.33 | 8.37 | 0.15 | 13.79 | 0.83 | 15.45 | 0.93 | 36.49 | 3.39 | | |
| 2:15 | 10.95 | 6.44 | 11.65 | 0.33 | 8.45 | 0.39 | 13.96 | 0.53 | 15.97 | 0.01 | 34.61 | 3.27 | | |
| 2:45 | 10.92 | 6.16 | 11.62 | 0.23 | 8.48 | 0.74 | 14.01 | 0 | 15.8 | 0.48 | 35.4 | 2.85 | | |
| 3:15 | 10.98 | 6.2 | 11.65 | 0.25 | 8.42 | 1.34 | 14.45 | 0.46 | 15.63 | 0.79 | 36.13 | 3.02 | | |
| 3:45 | 10.83 | 6.28 | 11.65 | 1.11 | 8.37 | 1.5 | 14.17 | 0.14 | 15.7 | 0.72 | 36.5 | 2.51 | | |
| 4:15 | 10.75 | 5.89 | 11.61 | 1.41 | 8.3 | 2.14 | 14.46 | 0.4 | 15.84 | 0.87 | 36.77 | 2.74 | | |
| 4:45 | 10.86 | 5.85 | 11.53 | 1.67 | 8.25 | 2.19 | 14.4 | 0.27 | 15.64 | 0.55 | 46.73 | 3.75 | | |
| 5:15 | 10.86 | 6.13 | 11.48 | 1.86 | 8.22 | 2.12 | 14.64 | 0.7 | 15.98 | 1.34 | 37.52 | 3.9 | | |
| 5:45 | 10.79 | 6.42 | 11.49 | 2.07 | 8.16 | 2.02 | 14.51 | 0.97 | 15.68 | 1.34 | 48.2 | 5.57 | | |
| 6:15 | 10.82 | 6.71 | 11.39 | 2.24 | 8.13 | 2 | 14.72 | 1.81 | 15.63 | 1.12 | 37.7 | 5.53 | | |
| 6:45 | 10.81 | 6.77 | 11.34 | 2.42 | 8.09 | 2.06 | 14.85 | 1.95 | 16.08 | 1.46 | 49.31 | 5.4 | | |
| 7:15 | 10.68 | 7.07 | 11.31 | 2.62 | 8.02 | 1.88 | 14.87 | 2.16 | 15.59 | 2.11 | 49.58 | 8.62 | | |
| 7:45 | 10.77 | 6.94 | 11.26 | 2.98 | 7.95 | 1.86 | 15.17 | 1.91 | 15.82 | 2.65 | 41.83 | 7.85 | | $CO_2$ turned on |
| 8:15 | 26.65 | 6.65 | 11.65 | 3.18 | 9.54 | 1.53 | 15.64 | 1.75 | 28.35 | 1.32 | 48.72 | 10.7 | 6.44 | |
| 8:45 | 8.8 | 5.72 | 28.39 | 12.15 | 23.19 | 0.52 | 25.05 | 7.06 | 54.14 | 44.29 | 83.72 | 40.14 | 6.35 | Added 1 gram white lime |
| 9:15 | 8.57 | 3.28 | 12.46 | 8.4 | 34.69 | 3.58 | 43.3 | 18.73 | 49.84 | 20.89 | 113.47 | 19.76 | 6.39 | |
| 9:45 | 12.33 | 3.68 | 10.8 | 5.41 | 33.31 | 19.78 | 46.68 | 42.22 | 61.54 | 26.55 | 140.97 | 31.12 | 6.16 | |
| 10:15 | 10.21 | 3.61 | 7.66 | 1.84 | 27.17 | 9.79 | 33.07 | 22.45 | 51.74 | 22.57 | 106.71 | 25.52 | 6.16 | Added 5 mL hydrated white lime (2 grams total) |
| 10:45 | 15.91 | 2.63 | 8.64 | 1.46 | 25.62 | 7.03 | 32.06 | 19.87 | 54.68 | 30.1 | 124.57 | 20.36 | 6.42 | |
| 11:15 | 19 | 4.59 | 9.57 | 1.38 | 25.74 | 5.4 | 27.7 | 16.14 | 48.25 | 24.9 | 109.28 | 11.93 | 6.34 | Added 5 mL hydrated white lime (3 grams total) |
| 11:45 | 9.06 | 8.14 | 6.05 | 3.38 | 30.06 | 2.29 | 29.7 | 20.64 | 45.06 | 42.07 | 120.16 | 1.56 | 6.37 | $CO_2$ turned off, |

TABLE IIIA-continued

Corrosion Test

| | Example 5 Test 7 | | Example 9 Test 8 | | Example 10 Test 9 | | Example 11 Test 10 | | Example 12 Test 11 | | Blank Test 12 | | | |
|---|---|---|---|---|---|---|---|---|---|---|---|---|---|---|
| Time | Rate | Imbal-ance | Rate | Imbal-ance | Rate | Imbal-ance | Rate | Imbal-ance | Rate | Imbal-ance | Rate | Imbal-ance | pH | Comments |
| | | | | | | | | | | | | | | Added 1 gram Sodium Sulfide |
| 12:15 | 11.44 | 15.56 | 3.68 | 1.36 | 11.25 | 6.26 | 20.82 | 21.71 | 18.77 | 35.39 | 247.26 | 76.42 | 6.68 | |
| 12:45 | 9.22 | 2.03 | 5.44 | 1.74 | 6.98 | 4.91 | 12.57 | 12.49 | 17.9 | 3.84 | 141.74 | 53.26 | 6.74 | |
| 1:15 | 9.22 | 2.03 | 6.8 | 1.43 | 5.82 | 1.63 | 9.76 | 11.5 | 18.31 | 12.44 | 103.51 | 47.51 | 6.75 | |
| 1:45 | 7.45 | 1.69 | 6.8 | 1.43 | 5.32 | 0.79 | 8.75 | 8.89 | 20.89 | 15.37 | 73.05 | 10.66 | 6.77 | |
| 2:15 | 9.55 | 2.32 | 6.98 | 0.51 | 5.27 | 0.47 | 8.58 | 6.9 | 20.17 | 10.91 | 62.27 | 11.76 | 6.81–6.39 | $CO_2$ turned on |
| 2:45 | 9.3 | 5.48 | 10.48 | 0.16 | 5.48 | 1.31 | 7.9 | 5.19 | 30.62 | 6.75 | 74.91 | 6.85 | 6.50 | |
| 3:15 | 18.42 | 0.72 | 15.67 | 5.48 | 14.39 | 1.92 | 8.86 | 5.23 | 28.19 | 95.66 | 63 | 8.37 | 6.40 | $CO_2$ turned off, Added 5 mL hydrated white lime (4 grams total) |
| 3:45 | 11.16 | 2.85 | 8.33 | 1.99 | 8.05 | 3.59 | 6.34 | 3.25 | 34.95 | 114.48 | 58.85 | 0.71 | | |
| 4:15 | 9.29 | 4.63 | 7.85 | 0.36 | 6.79 | 3.29 | 6.5 | 2.14 | 35.24 | 71.39 | 53.84 | 0.2 | | |

Figure 4A:
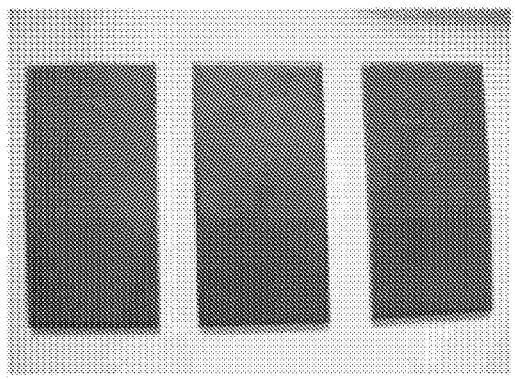
FIGS. 4A&B depicts a photograph of the coupons from Tests 13-15 pre-acid washed and post acid wash, respectively.
Figure 4B:
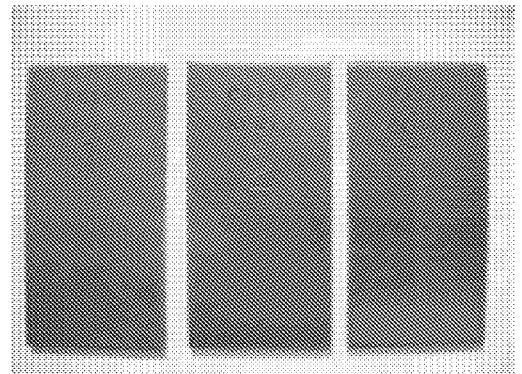
FIGS. 4C&D depicts a photograph of the coupons from Tests 16-18 pre-acid wash and post acid wash, respectively.
FIGS. 4E&F depicts a photograph of the solutions of Tests 13-15 and Tests 16-18, respectively.
Figure 4C:
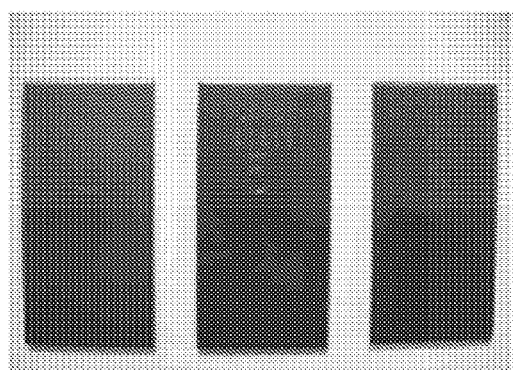
Figure 4D:
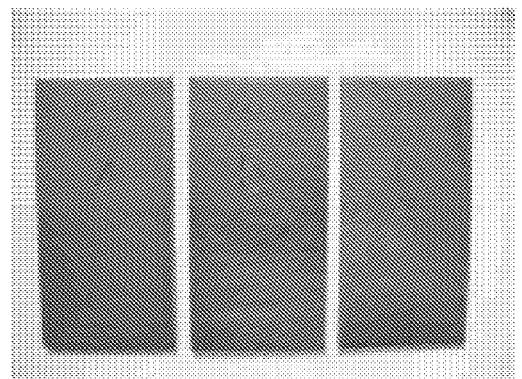
Figure 4E:
Figure 4F:

The solutions of Examples 13-17 along with blanks were placed in a stainless steel bomb along with coupons 3-5 from the above test. The bombs were place in an oven on a roller mill and the temperature was adjusted to 450° F. The bombs were rolled under their own pressure for one day and the coupons analyzed pre-acid clean up and post acid clean up. The results are tabulated in Table IVA&B. Looking at FIGS. 4A&B, the coupons from Tests 13-15 are shown both pre-acid wash, FIG. 4A, and post acid wash, FIG. 4B. Looking at FIGS. 4C&D, the coupons from Tests 16-18 are shown both pre-acid wash, FIG. 4C, and post acid wash, FIG. 4D. Looking at FIGS. 4E&F, the solutions of Tests 13-15 and Tests 16-18 are shown.

Coupons were added to the solutions of Examples 13-17 along with two blanks and the solutions with the coupons were then run in an autoclave at 500° F. and at a pressure of 5000 psi. The solutions were adjusted to pH 10 with sodium hydroxide and 5 mL per 1100 mL of 20 wt. % Calcium hydroxide was added along with 1 g of NaS per 1100 mL. The results of the tests are tabulate in Table VA&B, which clearly shows the significant protection afforded the coupons by the compositions of Examples 16 and 17. These solutions are particularly preferred because these solutions include an acid inhibitor, a scale inhibitor and a sulfur scavenger, where the scale inhibitor is a salt of a phosphate ester, the acid inhibitor includes a quinoline cationic surfactant and the sulfur scav-

TABLE IVA

Pre Acid Clean Up 450° F.

| Test # | Coupon # | Test Solution | Initial Weight | Final Weight | Time (Days) | Density (g/cm$^3$) | SA (in$^2$) | Wt. Loss | Corrosion (mpy) | Corrosion (lb/ft$^2$/yr) | Comments |
|---|---|---|---|---|---|---|---|---|---|---|---|
| 13 | 1B | Example 13 | 20.4421 | 20.4518 | 1 | 7.85 | 4.372 | −0.0097 | −6.3 | −026 | Moderate amt. of scale |
| 14 | 2B | Example 14 | 20.9572 | 20.9720 | 1 | 7.85 | 4.372 | −0.0148 | −9.6 | −0.39 | Most scale |
| 15 | 3B | Example 15 | 20.8526 | 20.8560 | 1 | 7.85 | 4.372 | −0.0034 | −2.2 | −0.09 | Small amt. of scale |
| 16 | 4B | Example 16 | 20.4657 | 20.4591 | 1 | 7.85 | 4.372 | 0.0066 | 4.3 | 0.17 | |
| 17 | 5B | Example 17 | 21.0015 | 20.9964 | 1 | 7.85 | 4.372 | 0.0051 | 3.3 | 0.13 | |
| 18 | 6B | Blank | 20.5335 | 20.5235 | 1 | 7.85 | 4.372 | 0.0100 | 6.5 | 0.26 | | mpy = (weight loss in grams) * (22,300)/(Adt)

TABLE IVB

Post Acid Clean Up 450° F.

Figure 5A:
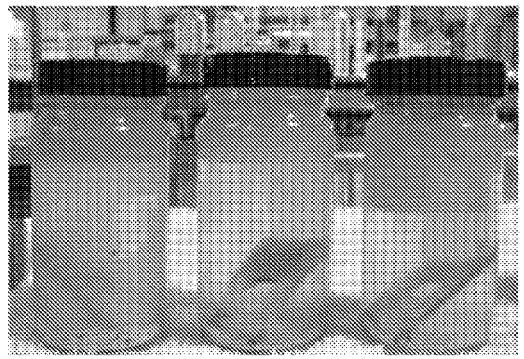
FIG. 5A depicts a photograph of the Test 19 solutions of Example 13 after 24 hours in the autoclave.
Figure 5B:
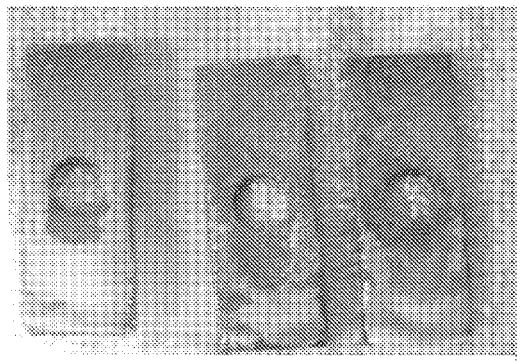
FIGS. 5B-D depict coupons 11-13 immediately upon removal from the Test 19 solutions, prior to acid washing and after acid washing, respectively.
Figure 5C:
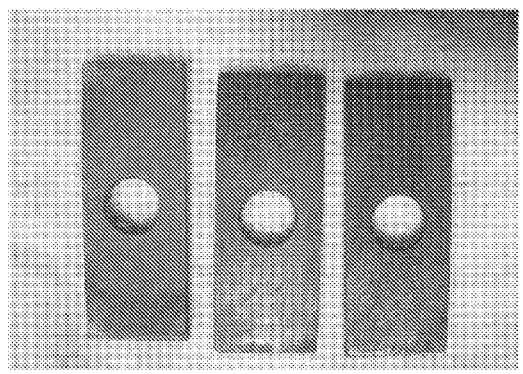
Figure 5D:
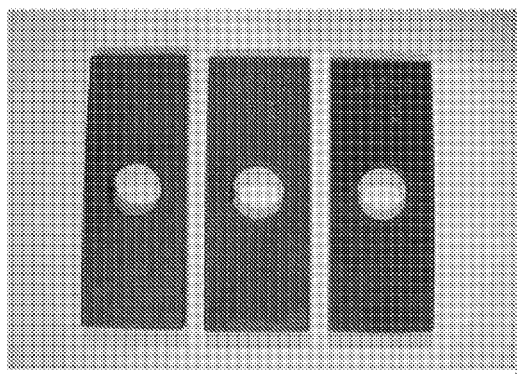
Figure 5E:
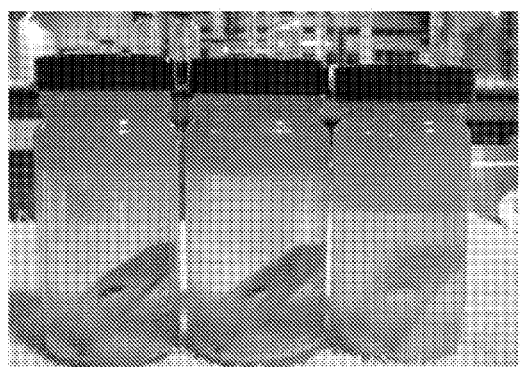
FIG. 5E depicts the Test 20 solutions of Example 14 after 24 hours in the autoclave.
Figure 5F:
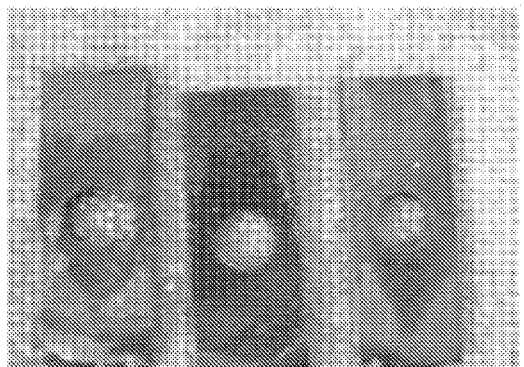
FIGS. 5F-H depict the coupons 14-16 immediately upon removal from the Test 20 solutions, prior to acid washing and after acid washing, respectively.
Figure 5G:
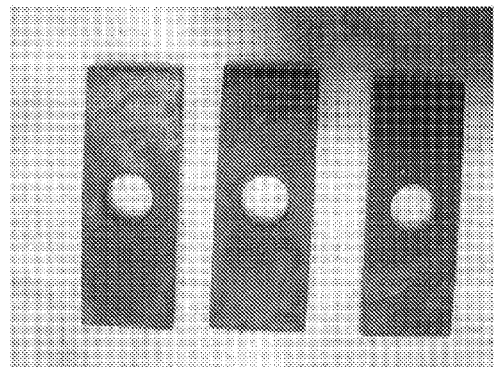
Figure 5H:
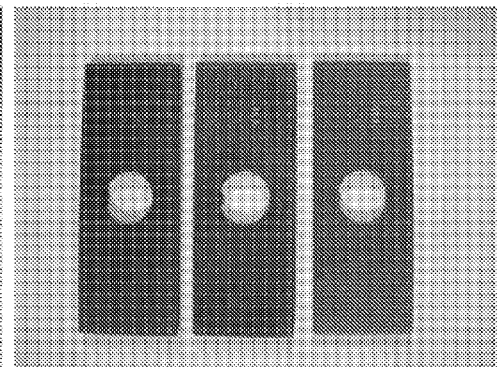
Figure 5I:
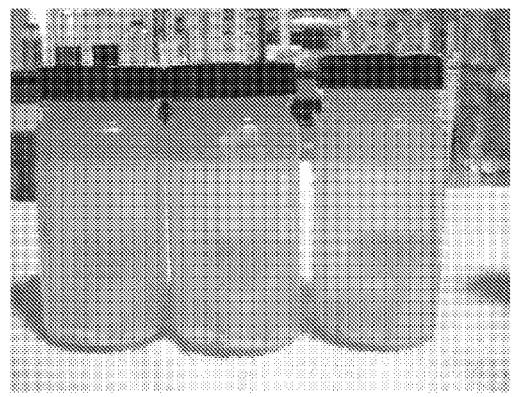
FIG. 5I depicts the Test 21 solutions of Example 15 after 24 hours in the autoclave.
Figure 5J:
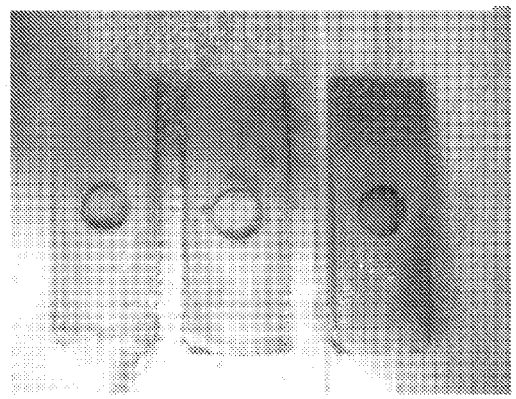
FIGS. 5J-L depict the coupons 17-19 immediately upon removal from the Test 21 solutions, prior to acid washing and after acid washing, respectively.
Figure 5K:
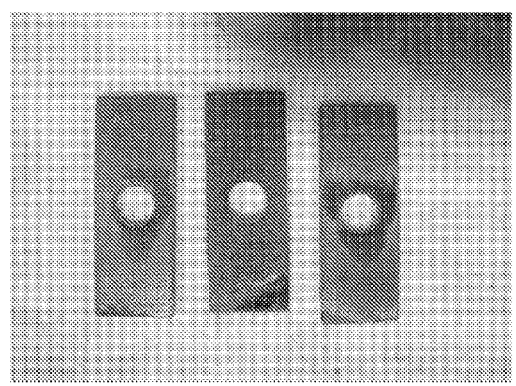
Figure 5L:
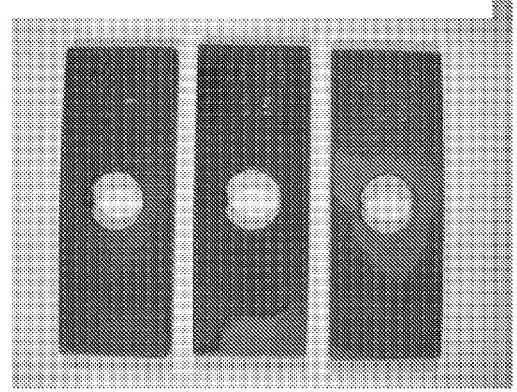
Figure 5M:
FIG. 5M depicts the Test 22 solutions of Example 16 after 24 hours in the autoclave.
Figure 5N:
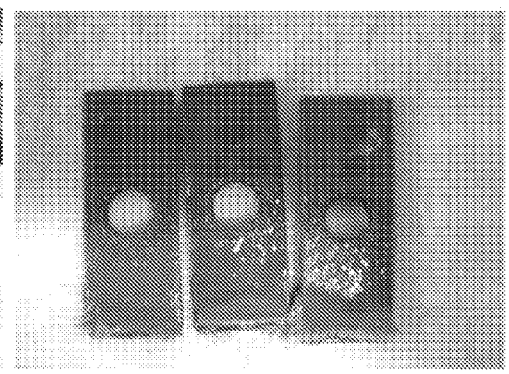
FIGS. 5N-P depict the coupons 20-22 immediately upon removal from the Test 22 solutions, prior to acid washing and after acid washing, respectively.
Figure 5O:
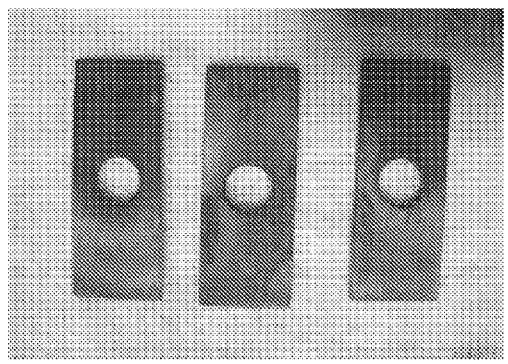
Figure 5P:
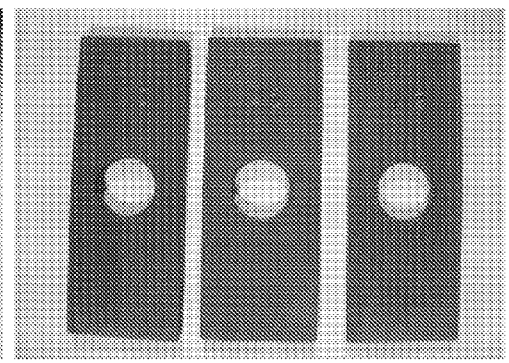
Figure 5Q:
FIGS. 5R-T depict the coupons 23-25 are shown immediately upon removal from the Test 23 solutions, prior to acid washing and after acid washing, respectively.
FIG. 5U depicts the Test 24 solutions of Blank are shown after 24 hours in the autoclave.
FIGS. 5V-X depict the coupons 26-28 are shown immediately upon removal from the Blank solutions, prior to acid washing and after acid washing, respectively.
FIG. 5Y depicts the Test 25 solutions of Blank with 3.5 wt. % Seawater are shown after 24 hours in the autoclave.
FIGS. 5Z AA & AB depicts the coupons 29-30 are shown immediately upon removal from the Test 25 solutions, prior to acid washing and after acid washing, respectively.
Figure 5R:
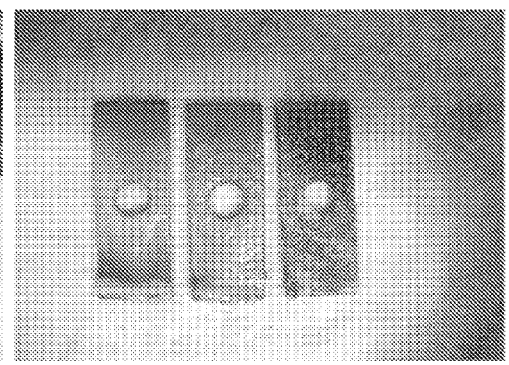
Figure 5S:
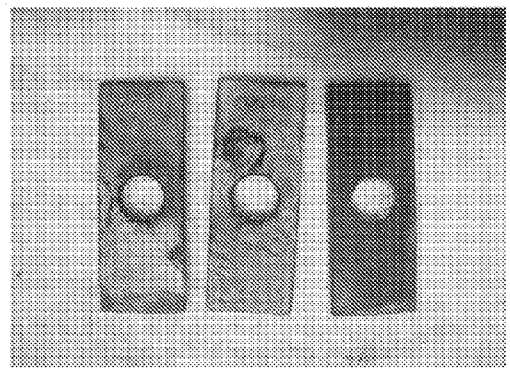
Figure 5T:
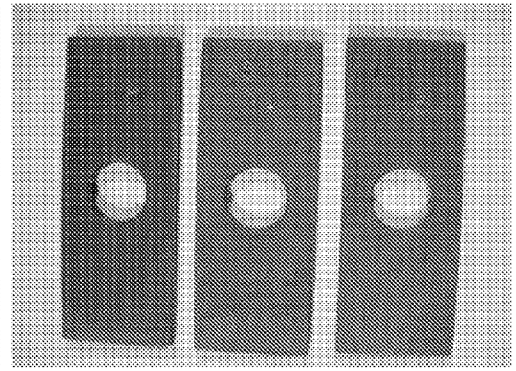
Figure 5U:
Figure 5V:
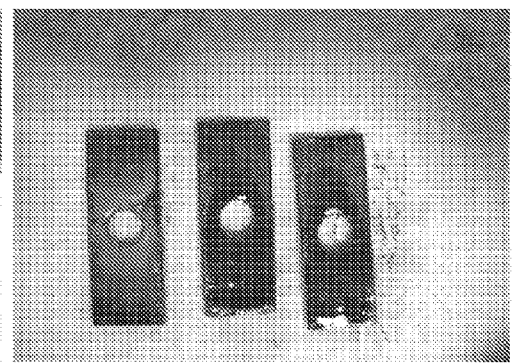
Figure 5W:
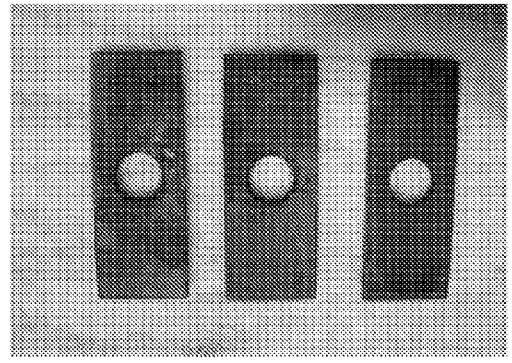
Figure 5X:
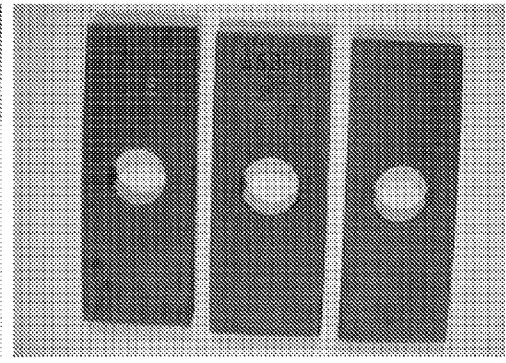
Figure 5Y:
Figure 5Z:
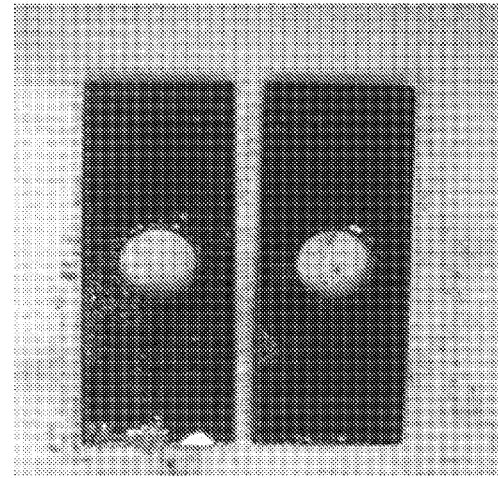
Figure 5A:
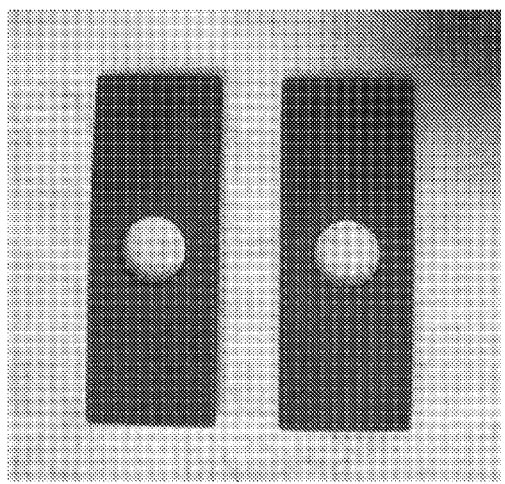
Figure 5A:
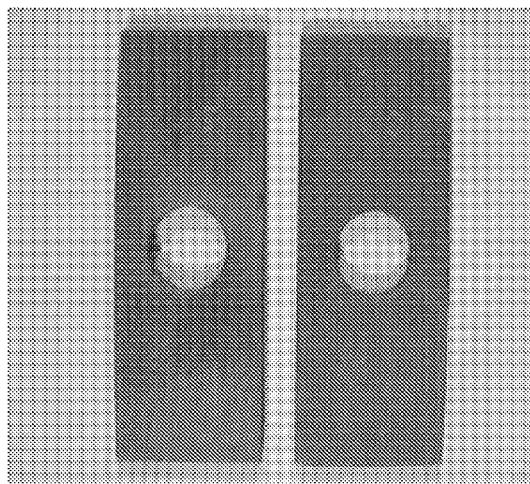

| Test # | Coupon # | Test Solution | Initial Weight | Final Weight | Time (Days) | Density (g/cm$^3$) | SA (in$^2$) | Wt. Loss | Corrosion (mpy) | Corrosion (lb/ft$^2$/yr) | Comments |
|---|---|---|---|---|---|---|---|---|---|---|---|
| 13 | 1B | Example 13 | 20.4421 | 20.3836 | 1 | 7.85 | 4.372 | 0.0595 | 38.0 | 1.55 | |
| 14 | 2B | Example 14 | 20.9572 | 20.8969 | 1 | 7.85 | 4.372 | 0.0603 | 39.2 | 1.59 | |
| 15 | 3B | Example 15 | 20.8526 | 20.8322 | 1 | 7.85 | 4.372 | 0.0204 | 13.3 | 0.54 | |
| 16 | 4B | Example 16 | 20.4657 | 20.4492 | 1 | 7.85 | 4.372 | 0.0165 | 10.7 | 0.44 | |
| 17 | 5B | Example 17 | 21.0015 | 20.9882 | 1 | 7.85 | 4.372 | 0.0133 | 8.6 | 0.35 | |
| 18 | 6B | Blank | 20.5335 | 20.4992 | 1 | 7.85 | 4.372 | 0.0343 | 22.3 | 0.91 | | mpy = (weight loss in grams) * (22,300)/(Adt)

enger can be either a triazine-type sulfur scavenger or a non-triazine formaldehyde-amine reaction production. Looking at FIG. 5A, the Test 19 solutions of Example 13 are shown after 24 hours in the autoclave. Looking at FIG. 5B-D, the coupons 11-13 are shown immediately upon removal from the Test 19 solutions, prior to acid washing and after acid washing, respectively. Looking at FIG. 5E, the Test 20 solutions of Example 14 are shown after 24 hours in the autoclave. Looking at FIG. 5F-H, the coupons 14-16 are shown immediately upon removal from the Test 20 solutions, prior to acid washing and after acid washing, respectively. Looking at FIG. 5I, the Test 21 solutions of Example 15 are shown after 24 hours in the autoclave. Looking at FIG. 5J-L, the coupons 17-19 are shown immediately upon removal from the Test 21 solutions, prior to acid washing and after acid washing, respectively. Looking at FIG. 5M, the Test 22 solutions of Example 16 are shown after 24 hours in the autoclave. Looking at FIG. 5N-P, the coupons 20-22 are shown immediately upon removal from the Test 22 solutions, prior to acid washing and after acid washing, respectively. Looking at FIG. 5Q, the Test 23 solutions of Example 17 are shown after 24 hours in the autoclave. Looking at FIG. 5R-T, the coupons 23-25 are shown immediately upon removal from the Test 23 solutions, prior to acid washing and after acid washing, respectively. Looking at FIG. 5U, the Test 24 solutions of Blank are shown after 24 hours in the autoclave. Looking at FIG. 5V-X, the coupons 26-28 are shown immediately upon removal from the Blank solutions, prior to acid washing and after acid washing, respectively. Looking at FIG. 5W, the Test 25 solutions of Blank with 3.5 wt. % Seawater are shown after 24 hours in the autoclave. Looking at FIG. 5Z, AA & AB, the coupons 29-30 are shown immediately upon removal from the Test 25 solutions, prior to acid washing and after acid washing, respectively.

TABLE VA

Pre Acid Clean Up 500° F.

| Test # | Coupon # | Test Solution | Initial Weight | Final Weight | Time (Days) | Density (g/cm$^3$) | SA (in$^2$) | Wt. Loss | Corrosion (mpy) | Average (mpy) | Corrosion (lb/ft$^2$/yr) | Average (lb/ft$^2$/yr) |
|---|---|---|---|---|---|---|---|---|---|---|---|---|
| 19 | 11 | Example 13 | 21.994 | 22.0128 | 1 | 7.87 | 3.467 | −0.0188 | −15.4 | −30.84 | −0.62 | −1.25 |
| 19 | 12 | Example 13 | 22.2818 | 22.3284 | 1 | 7.87 | 3.467 | −0.0466 | −38.1 | | −1.55 | |
| 19 | 13 | Example 13 | 22.5425 | 22.5903 | 1 | 7.87 | 3.467 | −0.0478 | −39.1 | | −1.59 | |
| 20 | 14 | Example 14 | 22.1137 | 22.1486 | 1 | 7.87 | 3.467 | −0.0349 | −28.5 | −33.65 | −1.16 | −0.74 |
| 20 | 15 | Example 14 | 22.4739 | 22.5055 | 1 | 7.87 | 3.467 | −0.0316 | −25.8 | | −1.05 | |
| 20 | 16 | Example 14 | 21.917 | 21.974 | 1 | 7.87 | 3.467 | −0.057 | −46.6 | | −1.89 | |
| 21 | 17 | Example 15 | 22.3933 | 22.4389 | 1 | 7.87 | 3.467 | −0.0456 | −37.3 | −40.05 | −1.51 | −1.63 |
| 21 | 18 | Example 15 | 22.2756 | 22.3229 | 1 | 7.87 | 3.467 | −0.0473 | −38.7 | | −1.57 | |
| 21 | 19 | Example 15 | 22.8684 | 22.9225 | 1 | 7.87 | 3.467 | −0.0541 | −44.2 | | −1.80 | |
| 22 | 20 | Example 16 | 22.6371 | 22.6479 | 1 | 7.87 | 3.467 | −0.0108 | −8.8 | −9.40 | −0.36 | −0.38 |
| 22 | 21 | Example 16 | 22.7625 | 22.7743 | 1 | 7.87 | 3.467 | −0.0118 | −9.6 | | −0.39 | |
| 22 | 22 | Example 16 | 22.8192 | 22.8311 | 1 | 7.87 | 3.467 | −0.0119 | −9.7 | | −0.40 | |
| 23 | 23 | Example 17 | 22.1256 | 22.1389 | 1 | 7.87 | 3.467 | −0.0133 | −10.9 | −10.82 | −0.44 | −0.44 |
| 23 | 24 | Example 17 | 22.112 | 22.1278 | 1 | 7.87 | 3.467 | −0.0158 | −12.9 | | −0.52 | |
| 23 | 25 | Example 17 | 22.6595 | 22.6701 | 1 | 7.87 | 3.467 | −0.0106 | −8.7 | | −0.35 | |
| 24 | 26 | Blank-Test Fluid | 22.3819 | 22.3741 | 1 | 7.87 | 3.467 | 0.0078 | 6.4 | 8.99 | 0.26 | 0.37 |
| 24 | 27 | Blank-Test Fluid | 22.3605 | 22.3515 | 1 | 7.87 | 3.467 | 0.009 | 7.4 | | 0.30 | |
| 24 | 28 | Blank-Test Fluid | 22.1093 | 22.0931 | 1 | 7.87 | 3.467 | 0.0162 | 13.2 | | 0.54 | |
| 25 | 29 | Blank-3.5% Seawater | 22.197 | 22.2694 | 1 | 7.87 | 3.467 | −0.0724 | −59.2 | −51.20 | −2.41 | −2.08 |
| 25 | 30 | Blank-3.5% Seawater | 22.6225 | 22.6754 | 1 | 7.87 | 3.467 | −0.0529 | −43.2 | | −1.76 | |

TABLE VB

Post Acid Clean Up 500° F.

| Test # | Coupon # | Test Solution | Initial Weight | Final Weight | Time (Days) | Density (g/cm$^3$) | SA (in 2) | Wt. Loss | Corrosion (mpy) | Average (mpy) | Corrosion (lb/ft$^2$/yr) | Average (lb/ft$^2$/yr) |
|---|---|---|---|---|---|---|---|---|---|---|---|---|
| 19 | 11 | Example 13 | 21.994 | 21.9594 | 1 | 7.87 | 3.467 | 0.0346 | 28.3 | 27.16 | 1.15 | 1.10 |
| 19 | 12 | Example 13 | 22.2818 | 22.2392 | 1 | 7.87 | 3.467 | 0.0426 | 34.8 | | 1.42 | |
| 19 | 13 | Example 13 | 22.5425 | 22.52 | 1 | 7.87 | 3.467 | 0.0225 | 18.4 | | 0.75 | |
| 20 | 14 | Example 14 | 22.1137 | 22.0692 | 1 | 7.87 | 3.467 | 0.0445 | 36.4 | 29.99 | 1.48 | 1.22 |
| 20 | 15 | Example 14 | 22.4739 | 22.4397 | 1 | 7.87 | 3.467 | 0.0342 | 28.0 | | 1.14 | |
| 20 | 16 | Example 14 | 21.917 | 21.8856 | 1 | 7.87 | 3.467 | 0.0314 | 25.7 | | 1.04 | |
| 21 | 17 | Example 15 | 22.3933 | 22.3496 | 1 | 7.87 | 3.467 | 0.0437 | 35.7 | 34.98 | 1.45 | 1.42 |
| 21 | 18 | Example 15 | 22.2756 | 22.2332 | 1 | 7.87 | 3.467 | 0.0424 | 34.7 | | 1.41 | |
| 21 | 19 | Example 15 | 22.8684 | 22.8261 | 1 | 7.87 | 3.467 | 0.0423 | 34.6 | | 1.41 | |
| 22 | 20 | Example 16 | 22.6371 | 22.6325 | 1 | 7.87 | 3.467 | 0.0046 | 3.8 | 4.66 | 0.15 | 0.19 |
| 22 | 21 | Example 16 | 22.7625 | 22.7568 | 1 | 7.87 | 3.467 | 0.0057 | 4.7 | | 0.19 | |
| 22 | 22 | Example 16 | 22.8192 | 22.8124 | 1 | 7.87 | 3.467 | 0.0068 | 5.6 | | 0.23 | |
| 23 | 23 | Example 17 | 22.1256 | 22.1205 | 1 | 7.87 | 3.467 | 0.0051 | 4.2 | 6.02 | 0.17 | 0.24 |
| 23 | 24 | Example 17 | 22.112 | 22.1062 | 1 | 7.87 | 3.467 | 0.0058 | 4.7 | | 0.19 | |
| 23 | 25 | Example 17 | 22.6595 | 22.6483 | 1 | 7.87 | 3.467 | 0.0112 | 9.2 | | 0.37 | |
| 24 | 26 | Blank-Test Fluid | 22.3819 | 22.3475 | 1 | 7.87 | 3.467 | 0.0344 | 28.1 | 29.31 | 1.14 | 1.19 |
| 24 | 27 | Blank-Test Fluid | 22.3605 | 22.3243 | 1 | 7.87 | 3.467 | 0.0362 | 29.6 | | 1.20 | |
| 24 | 28 | Blank-Test Fluid | 22.1093 | 22.0723 | 1 | 7.87 | 3.467 | 0.037 | 30.2 | | 1.23 | |
| 25 | 29 | Blank-3.5% Seawater | 22.197 | 22.1573 | 1 | 7.87 | 3.467 | 0.0397 | 32.4 | 26.28 | 1.32 | 1.07 |
| 25 | 30 | Blank-3.5% Seawater | 22.6225 | 22.5979 | 1 | 7.87 | 3.467 | 0.0246 | 20.1 | | 0.82 | |

The data clearly shows the superior protection afforded by the compositions of this invention that include a phosphate ester scale inhibitor, a cationic acid inhibitor and a sulfur scavenger. The protection is so significantly improved that metals in contact with fluids including the corrosion control systems of this invention will have significantly greater life times.

All references cited herein are incorporated by reference. While this invention has been described fully and completely, it should be understood that, within the scope of the appended claims, the invention may be practiced otherwise than as specifically described. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method comprising the step of:
   adding an effective amount of an aqueous-based corrosion control system to a fluid in contact with a metallic surface, where the system comprises:
   an anionic scale inhibitor selected from the group consisting of: (1) alkali metal, alkaline earth metal, or transition metal salts of alkyl phosphate esters; (2) alkali metal, alkaline earth metal, or transition metal salts of alkoxy phosphate esters; (3) alkali metal, alkaline earth metal, or transition metal salts of glycol phosphate esters; (4) alkali metal, alkaline earth metal, or transition metal salts of alkylpolyols phosphate esters and (5) mixtures or combinations thereof,
   a cationic acid inhibitor or dispersant,
   an inhibitor or scavenger of noxious sulfur-containing compounds comprising aldehyde-amine adducts, triazines, or mixtures or combinations thereof,
   a lime slurry or hot lime in an amount from about 1 to 10 lbs per barrel of the system, and
   water,
   where the composition is effective over a temperature range between about 100° F. and about 600° F. including a low temperature range between about 100° F. and about 250° F., a moderate temperature range between about 250° F. and about 450° F., and a high temperature range between about 450° F. and about 600° F.

2. The method of claim 1, wherein the anionic scale inhibitor comprises alkali metal, alkaline earth metal, or transition metal salts of alkyl phosphate esters or mixtures or combinations thereof.

3. The method of claim 1, wherein the anionic scale inhibitor comprises alkali metal, alkaline earth metal, or transition metal salts of alkoxy phosphate esters or mixtures or combinations thereof.

4. The method of claim 1, wherein the system further includes:
   pH modifier.

5. The method of claim 4, wherein the pH modifier is selected from the group consisting of KOH, NaOH, Ca(OH)$_2$, CaO, Na$_2$CO$_3$, NaHCO$_3$, MgO, Mg(OH)$_2$ and mixtures thereof.

6. The method of claim 1, wherein the system has a pH of about 10.0.

7. The method of claim 1, wherein the cationic acid inhibitor comprises a quinoline quaternary surfactant.

8. The method of claim 1, wherein the system further includes:
   a shale inhibitor.

9. The method of claim 1, wherein the anionic scale inhibitor comprises alkali metal, alkaline earth metal, or transition metal salts of glycol phosphate esters or mixture or combinations thereof.

10. The method of claim 1, wherein the anionic scale inhibitor comprises alkali metal, alkaline earth metal, or transition metal salts of alkypolyol phosphate esters or mixture or combinations thereof.

11. A method comprising the step of:
    adding an effective amount of a corrosion control system to a fluid in contact with a metallic surface, where the system comprises:
    an anionic scale inhibitor including alkali metal, alkaline earth metal, or transition metal salts of alkyl phosphate esters, alkali metal, alkaline earth metal, or transition metal salts of alkoxy phosphate esters, alkali metal, alkaline earth metal, or transition metal salts of glycol phosphate esters, alkali metal, alkaline earth metal, or transition metal salts of alkylpolyol phosphate esters or mixture or combinations thereof,
    a cationic acid inhibitor or dispersant,
    a inhibitor or scavenger of noxious sulfur-containing compounds comprising aldehyde-amine adducts, triazines, or mixtures or combinations thereof,
    a lime slurry or hot lime in an amount from about 1 to 10 lbs per barrel of the system, and
    water,
    where the composition is effective over a temperature range between about 100° F. and about 600° F. including a low temperature range between about 100° F. and about 250° F., a moderate temperature range between about 250° F. and about 450° F., and a high temperature range between about 450° F. and about 600° F.

12. The method of claim 11, wherein the anionic scale inhibitor comprises alkali metal, alkaline earth metal, or transition metal salts of alkyl phosphate ester, or mixtures or combinations thereof.

13. The method of claim 11, wherein the anionic scale inhibitor comprises alkali metal, alkaline earth metal, or transition metal salts of alkoxy phosphate esters or mixtures or combinations thereof.

14. The method of claim 11, wherein the anionic scale inhibitor comprises alkali metal, alkaline earth metal, or transition metal salts of glycol phosphate esters or mixtures or combinations thereof.

15. The method of claim 11, wherein the anionic scale inhibitor comprises alkali metal, alkaline earth metal, or transition metal salts of alkylpolyol phosphate esters or mixtures or combinations thereof.

16. The method of claim 11, wherein the cationic acid inhibitor comprises a quinoline quaternary surfactant.

17. The method of claim 11, wherein the system further includes:
    pH modifier and/or a shale inhibitor.

18. The method of claim 17, wherein the pH modifier is selected from the group consisting of KOH, NaOH, Ca(OH)$_2$, CaO, Na$_2$CO$_3$, NaHCO$_3$, MgO, Mg(OH)$_2$ and combination there of.

19. The method of claim 11, wherein the system has a pH of about 10.0.

20. A method comprising the step of:
    adding to a fluid in contact with a metallic surface an effective amount of a corrosion control system comprising:
    from about 1.25 ppm to about 5 wt. % of an anionic scale inhibitor comprising alkali metal, alkaline earth metal, or transition metal salts of an alkyl phosphate estes, alkali metal, alkaline earth metal, or transition metal salts of alkoxy phosphate ester, alkali metal, alkaline earth metal, or transition metal salts of glycol phosphate esters, alkali metal, alkaline earth metal, or transition metal salts of alkylpolyol phosphate esters or mixtures or combinations thereof, from about 0.25 wt. % to about 10 wt. % of a cationic acid inhibitor or dispersant comprising quaternary ammonium salts, salts of nitrogen bases, or mixtures or combinations thereof, where the salt is selected from the group consisting of chloride, bromide, iodide, dimethylsulfate, diethylsulfate, nitrite, hydroxide, alkoxides, and mixtures or combinations thereof, from about 0.1 wt. % up to about a 10:1 ratio of an inhibitor or scavenger of noxious sulfur-containing compounds comprising aldehyde-amine adducts, triazines, or mixtures or combinations thereof, based on a concentration of the noxious sulfur species such as $H_2S$ in ppm in the fluid to be treated, from about 1 to 10 lbs per barrel of a lime slurry or hot lime, and a balance being deionized water, where the effective amount is sufficient to reduce corrosion of metal in contact with the fluid and where the system is effective at temperatures between about 250° F. and about 600° F. and has a pH of about 10.0.

21. The method of claim 20, wherein the system further includes:

pH modifier and/or a shale inhibitor.

22. The method of claim 21, wherein the pH modifier is selected from the group consisting of KOH, NaOH, $Ca(OH)_2$, CaO, $Na_2CO_3$, $NaHCO_3$, MgO, $Mg(OH)_2$ and mixtures thereof.

* * * * *